(12) United States Patent
Klapman et al.

(10) Patent No.: US 8,527,719 B2
(45) Date of Patent: Sep. 3, 2013

(54) CONCURRENT ACCESS TO A MEMORY POOL SHARED BETWEEN A BLOCK ACCESS DEVICE AND A GRAPH ACCESS DEVICE

(76) Inventors: Matthew H. Klapman, Northbrook, IL (US); Brian E. Mastenbrook, Schaumburg, IL (US)

( * ) Notice: Subject to any disclaimer, the term of this patent is extended or adjusted under 35 U.S.C. 154(b) by 178 days.

(21) Appl. No.: 12/912,709

(22) Filed: Oct. 26, 2010

(65) Prior Publication Data
US 2011/0113210 A1 May 12, 2011

Related U.S. Application Data

(60) Provisional application No. 61/255,002, filed on Oct. 26, 2009.

(51) Int. Cl.
*G06F 13/00* (2006.01)
*G06F 13/28* (2006.01)
(52) U.S. Cl.
USPC .... 711/154; 711/112; 711/163; 711/E12.001; 713/165; 713/182
(58) Field of Classification Search
USPC ......... 711/154, 112, 163, E12.001; 713/165, 713/182
See application file for complete search history.

(56) References Cited

U.S. PATENT DOCUMENTS

| | | | |
|---|---|---|---|
| 2004/0030668 A1* | 2/2004 | Pawlowski et al. | 707/1 |
| 2004/0117836 A1* | 6/2004 | Karaoguz et al. | 725/81 |
| 2010/0299539 A1* | 11/2010 | Haines et al. | 713/193 |
| 2012/0023293 A1* | 1/2012 | Contino et al. | 711/115 |
| 2012/0030737 A1* | 2/2012 | Pagan et al. | 726/5 |

* cited by examiner

*Primary Examiner* — Edward Dudek, Jr.
(74) *Attorney, Agent, or Firm* — Gavrilovich, Dodd & Lindsey LLP

(57) ABSTRACT

A graph access device and block access device can simultaneously access a memory pool shared between the devices. The memory pool may include one or more memory arrays accessed as a single logical memory. The block access device accesses the memory pool as a flat array of memory blocks, and the graph access device accesses the memory pool as hierarchical file system. The simultaneous access is accomplished by monitoring one or more memory block access operations performed by the block access device, while it is accessing the memory pool. The block access operations are translated into a graph data structure including a plurality of pointers mapping the memory pool to the hierarchical file system. A processor regulates access to the memory pool, and is configured to permit the graph access device to access the memory pool concurrently with the block access device, in accordance with the graph data structure.

21 Claims, 14 Drawing Sheets

CONCURRENT ACCESS TO A MEMORY POOL SHARED BETWEEN A BLOCK ACCESS DEVICE AND A GRAPH ACCESS DEVICE

CLAIM OF PRIORITY UNDER 35 U.S.C. §119

The present Application for Patent claims priority to Provisional Application No. 61/255,002; entitled "Method, Systems, Apparatuses, and Articles of Manufacture for Adding Storage, Communications, Computation, and Services to One or More Electronic Devices and/or Data Networks," filed Oct. 26, 2009, and hereby expressly incorporated by reference in its entirety as though set forth fully herein.

TECHNICAL FIELD

The present disclosure relates generally to electronic data systems, and in particular, to computational and/or communications systems providing data storage.

BACKGROUND

The computer industry has several connectivity standards for peripherals, the most popular in recent years being the universal serial bus (USB). USB and other connectivity standards have migrated beyond computers to allow connectivity between a myriad of electronic devices. Some of the most widely used USB peripherals have been devices that provide data storage and wireless connectivity. There are several common USB "types" that have further defined connectivity protocols and conventions that are specific for a particular usage. These definitions enable USB devices that comply with these protocols to interoperate with host systems without needed special software to be added to the host. For example, a common USB connectivity protocol is the USB Mass Storage specification that enables USB hosts to write/read data to/from any USB peripheral that follows that specification.

Multi-functional peripheral devices are known. For example, there are USB peripherals that contain a central processing unit (CPU) to enable more useful functions, such as encryption/decryption to data storage. Also, combinations of data storage and wireless connectivity, for example, have been built into a single peripheral. When these multi-functional peripherals are USB devices, they typically behave as logically separate USB devices, even though they are physically in a single peripheral device. Each function complies with its respective USB profile, which defines interoperability between the host and each function, but these two functions operate exclusively of each other. For example, data storage would independently use the USB Mass Storage protocol, while a wireless function would use the USB Wireless Networking protocol. These independent functions may require separate software drivers for the host or require the host to support multiple USB protocols to access the different functions in the peripheral.

Existing USB architectures consist of the following types. FIG. 1 shows a typical prior art USB system 10 including a USB host 12 connected to a USB peripheral device 14. The USB storage peripheral 14 may be a solid-state thumb drive, rotating media hard-drive, CD, DVD drive or the like. There is a USB interface 16 that consists of a state machine to run the USB storage protocol, and this connects to the physical data storage 18, accessing the data in an array consisting of "blocks" of data (e.g., addressable 512 blocks) for reading and/or writing. The USB host 12 defines the higher level data structures, such as files, folders, directories, and storage management arrays (e.g., file allocation tables).

FIG. 2 shows a prior art USB communication system 20, which has a similar architecture as the system 10 of FIG. 1, except that the USB peripheral device 22 includes wireless or wireline communication electronics 24 coupled to the UBS interface 16. This arrangement may correspond to a USB standard or require a special software driver on the host 12 to properly interface to the communication electronics 24.

FIG. 3 depicts a prior art system 30 where a USB peripheral 32 combines two functions, data storage 18 and wireless or wireline communication electronics 24, within a single USB peripheral 32. The USB protocol allows multiple logical paths that the USB host 12 sees as two virtually separate USB peripherals. While there is some physical sharing of internal peripheral components by the storage and wireless functions in this example, such as sharing power supplies and the USB slave controller, there is not any direct communications between the storage and the wireless functions within the USB peripheral 32. They are treated logically as mutually exclusive devices.

FIG. 4 shows a prior art system 40 where a USB peripheral 42 includes a function internal to the USB peripheral device 42 that is transparent to the USB host 12, in this case, encryption/decryption 44. The USB host 12 sees the data storage 18 as a normal, unencrypted data storage array, but if proper authentication is not correct, such as with a fingerprint sensor on the device 42 or password, the decryption will fail and the USB host 12 will not be able to access the data storage 18.

SUMMARY

There is a need to add functionality to peripherals without requiring updates to a host. Reducing the need for additional host software is desirable, especially for low cost devices. Also, there is a need to add additional functionality to peripherals to either address shortcomings with the current protocols and/or to add functionality without adding complexity for the user. These needs and others are addressed by the improvements disclosed herein.

According to an aspect of this disclosure, a method for a graph access device and a block access device to simultaneously access a memory pool shared between the devices is provided. A graph access device may be any electronic device, e.g. a computer, that accesses data organized into a graph, e.g., a hierarchical file system structure, whereby the graph is resolved into specific addresses within the memory pool using a data structure. A block access device is any electronic device that accesses a memory using discrete start location addresses and end location addresses, where any graph access has been previously resolved to block memory exclusive from the device. The memory pool may be included, at least in part, in a peripheral device. The method includes monitoring one or more memory block access operations performed by the block access device while accessing the memory pool; translating the block access operations into a graph data structure including a plurality of pointers mapping the memory pool to a hierarchical file system; and the graph access device accessing the memory pool concurrently with the block access device, according to the graph data structure.

According to another aspect, an apparatus includes a memory pool shared between a graph access device and a block access device. The apparatus also includes means for monitoring one or more memory block access operations performed by the block access device while accessing the memory pool; means for translating the block access operations into a graph data structure including a plurality of pointers mapping the memory pool to a hierarchical file system; and means for the graph access device accessing the memory pool concurrently with the block access device, according to the graph data structure.

According to a further aspect, a peripheral device includes a memory, a first communication interface and a second communication interface. The memory is shared between a graph access device and a block access device. The first communication interface is configured to communicate with the block access device and the second communication interface is configured to communicate with the graph access device. The processor is configured to monitor one or more memory block access operations performed by the block access device while accessing the memory; translate the block access operations into a graph data structure including a plurality of pointers mapping the memory to a hierarchical file system, and permit the graph access device to concurrently access the memory, according to the graph data structure, while the block access device is also accessing the memory.

According to a further aspect, a peripheral device communicates with an external host or client device and makes an intelligent determination whether the host/client device needs to communicate using block or graph access. The peripheral device then communicates with the external device accordingly.

Other aspects, features, advantages and variations of the improvements described herein will be or will become apparent to one with skill in the art upon examination of the following figures and detailed description. It is intended that all such additional aspects, features, variations and advantages be included within this description and be protected by the accompanying claims.

BRIEF DESCRIPTION OF THE DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

The following detailed description, which references to and incorporates the drawings, describes and illustrates one or more specific embodiments of what is claimed. These embodiments, offered not to limit but only to exemplify and teach the invention, are shown and described in sufficient detail to enable those skilled in the art to practice the invention defined by the claims. Thus, where appropriate to avoid obscuring the invention, the description may omit certain information known to those of skill in the art.

The word "exemplary" is used throughout this disclosure to mean "serving as an example, instance, or illustration." Any embodiment or feature described herein as "exemplary" is not necessarily to be construed as preferred or advantageous over other embodiments or features.

Disclosed herein are novel solutions for peripherals that improve the utility of existing systems while minimizing or eliminating updates to the host system and/or provide new features without adding complexity to the user.

The solutions consist of new methods and architectures for peripheral devices, such as USB peripherals, that leverage the widely used protocols used for data storage, such as the USB Mass Storage protocol, and add additional functionality without requiring additional host software or requiring other USB communication protocols. This additional functionality may include, but is not limited to, additional communication interfaces, security, server, synchronization, and other services that tie into larger networks, such as the Internet.

Although the exemplary architectures and method described herein utilize USB, the methods and architectures are not limited to USB, and other buses and communications protocols may be used instead, e.g., eSATA, iSCSI, or the like.

It is a further advantage to provide new services that are enabled as a result of leveraging the peripheral device architectures and methods disclosed herein. For example, novel system architectures are also disclosed that incorporates wider area networks to provide services for users without adding complexity for the user.

I. Peripheral Device Architecture

Figure 1:
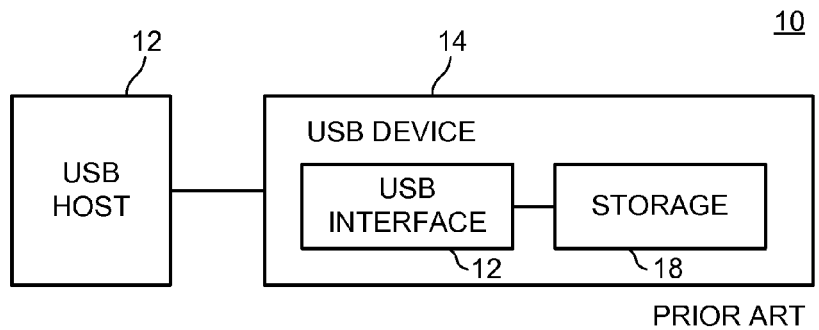
FIGS. 1-4 illustrate prior art peripheral systems.
Figure 2:
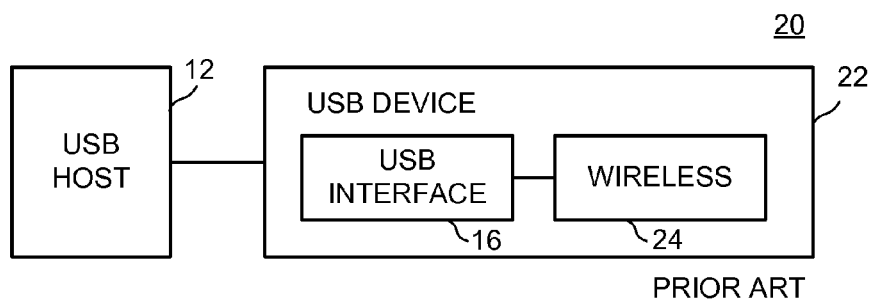
Figure 3:
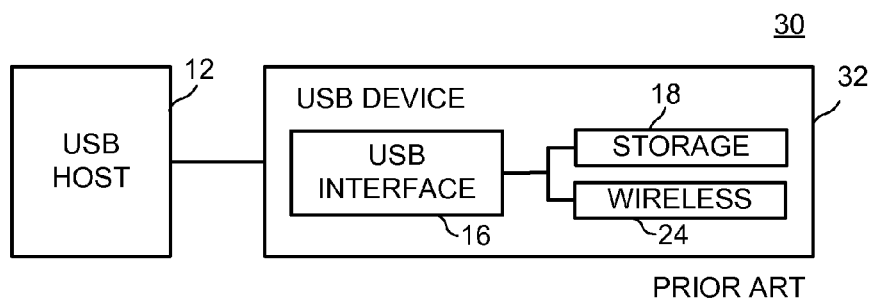
Figure 4:
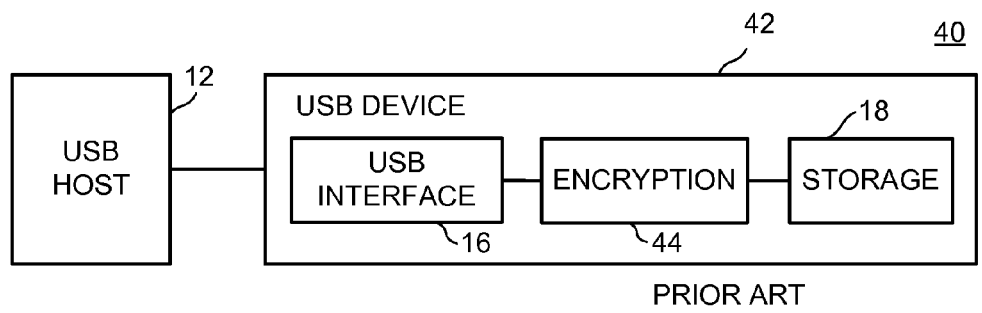
Figure 5:
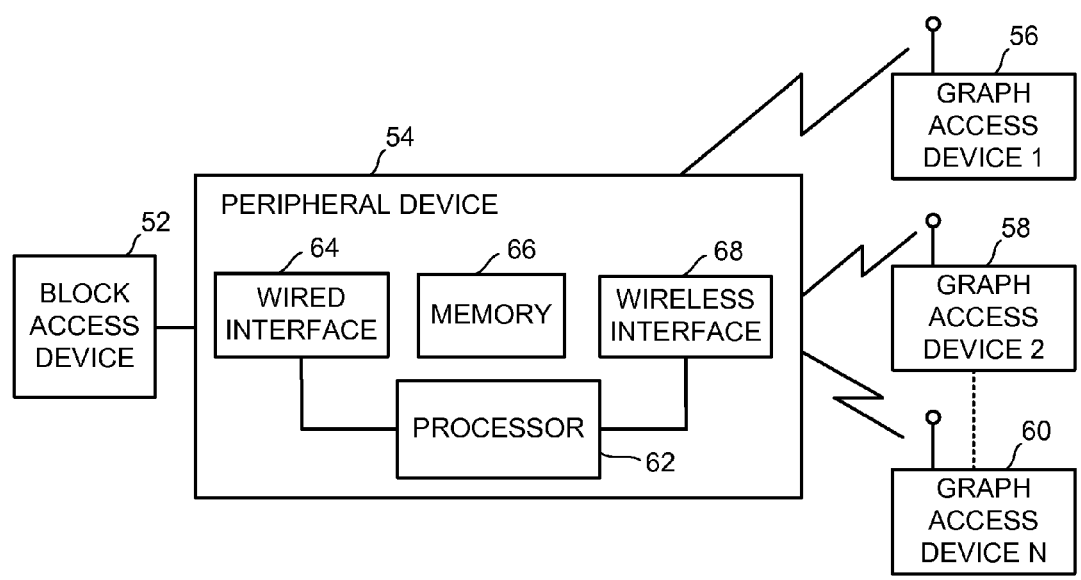
FIG. 5 is a block diagram illustrating certain components of an exemplary system including a multi-functional peripheral device allowing simultaneous access to a memory.

FIG. 5 is a block diagram illustrating certain components of an exemplary system 50 including a multi-functional peripheral device 54 allowing simultaneous access to a memory 66 by a block access device 52 and one or more graph access devices 56, 58, 60. The system 50 includes the block access device 52, the peripheral device 54 and the graph access devices 56, 58, 60. The block access device 52 communicates with the peripheral 54 over a wireline (wired) connection, and the graph access devices 56-60 communicate with the peripheral 54 over one or more wireless links.

Each graph access device 56-60 may be any electronic device, e.g., a computer, personal digital assistant (PDA), cellular phone video game console, or the like, that accesses data organized into a graph, e.g., a hierarchical file system structure, whereby the graph is resolved into specific addresses within the memory 66 using a graph data structure. The graph data structure defines a set of mappings between graph(s) and memory pool(s). A memory pool is one or more memory arrays accessed as a single, logical memory array.

More specifically, the graph data structure including a plurality of pointers mapping the memory 66 to a hierarchical file system. Examples of graph data structures that can be used with the peripherals 54, 70, 100 described herein may include a file storage database such as the file allocation table (FAT) or its variants (vFAT, FAT32, FAT16, exFAT, NTFS, NFS, and the like).

The memory 66 is a memory pool, or may be part of a larger memory pool including other physical memories and/or devices. The data structure and data contents may reside in the same memory pool, e.g., the file allocation table (FAT) file system that contains pointers and the data are stored together in a common memory pool. Alternatively, the graph data structure can be stored in a separate memory. In some instances, a graph access device 56-60 is a Wi-Fi client. In other instances, a graph access device 56-60 can be a USB host.

Figure 6:
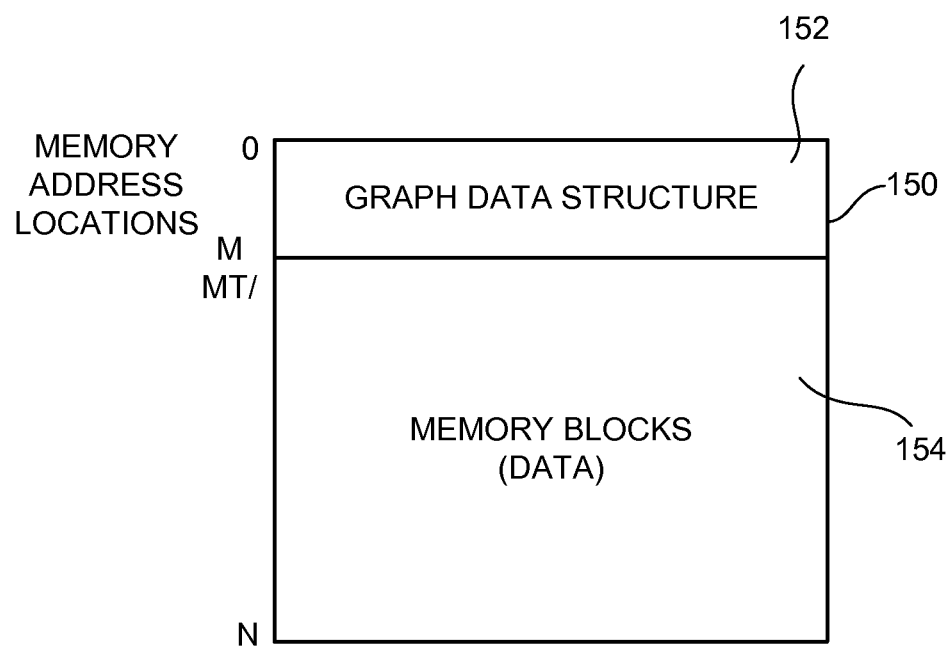
FIG. 6 is a conceptual diagram of the exemplary contents stored in the memory included in the multi-functional peripheral device of FIG. 5.

FIG. 6 is a high-level conceptual diagram illustrating an exemplary portion 150 of the memory 66 storing the graph data structure 152 and data contents 154 together in the shared memory 66. In the example shown, the graph data structure 152 resides in memory locations 0-m, and the data 154 resides in memory blocks located at addresses m+1 to n. Although shown as being at contiguous memory locations, the data 154 and graph data structure 152 do not need to be located in contiguous memory blocks, and may be fragmented in the memory 66 or other memories.

Returning to FIG. 5, the block access device 52 may be any electronic device e.g., a computer, personal digital assistant (PDA), cellular phone, video game console, or the like, that accesses the memory 66 using a low-level addressing scheme, i.e., discrete start location addresses and end location addresses, without the use of a graph data structure. In some instances, the block access device 52 is a USB host running the USB Mass Storage protocol to access the peripheral 54.

The peripheral device 54 includes a processor 62, a wired interface 64, the memory 66 and a wireless interface 68. The processor 62 may be any suitable digital processor, such as a microprocessor or DSP executing software/firmware instructions, application specific integrated circuit (ASIC), state machine implemented in hardware, or the like for performing the functions disclosed herein. The memory 66 may be any suitable memory device, including a memory detachable from the peripheral device 54, such as a secure digital (SD) card, SDHC card, SDXC card, hard drive, or solid state memory. The wired communication between the block access device 52 and peripheral 54 is preferably USB, and the wireless communications may be Wi-Fi. Thus, the wired interface 64 may be a commercially available USB interface module, and the wireless interface 68 may be a commercially available Wi-Fi interface module.

The peripheral 54 contains more than one function, where one of the functions may be a data storage array in the memory 66 accessible to either the block access device 52 or the graph access devices 56-60. In the example shown, the other function is the wireless communications interface 68. The data storage array is treated as a shared memory on the peripheral 54. It is shared between the functions and/or external devices supported by the peripheral 54. The processor 62 maps each function to the memory 66, and controls accesses to the memory 66 by the block access and graph access devices 52, 56-60. Using the shared memory 66, the functions provided by the peripheral 54, e.g., the wireless interface 68 and data storage array, do not need to communicate directly with each other in order to communicate or share data between the external block access device 52 and graph access devices 56-60. Instead, the functions indirectly communicate with each other through the memory 66.

The processor 62 is configured to permit simultaneous access to the memory 66 by the block access device 52 and graph access devices 56-60. This is accomplished by the processor 62 monitoring one or more memory block access operations performed by the block access device 52 while accessing the memory 66. As will be described in greater detail below, the processor 62 translates the block access operations into a graph data structure including a plurality of pointers mapping the memory 66 to a hierarchical file system. This permits any of the graph access devices 56-66 to concurrently access the memory 66 with the block access device 52. The one or more of the graph access devices 56-66 may access the memory 66 according to the graph data structure, while the block access device is also accessing the memory 66.

As used herein, the terms "simultaneous," "simultaneously," "concurrent" and "concurrently" may take their ordinary meanings, but also mean "apparently simultaneous" and "apparently concurrent," i.e., that the memory accesses appear to be simultaneous by users and/or processes at the block access device 52 and at least one of the graph access devices 56-60, even though the actual memory accesses within the peripheral device 54, 70 or 100 may occur sequentially. Two practical methods for providing simultaneous access to the peripheral memory can be either multiplexed access to the memory at a rate such that it appears as simultaneous, or true simultaneous access by including a multi-port memory in the peripheral.

Although the block access device 52 is shown in FIG. 5 as being connected to the peripheral via the wired interface 64, the block access device may alternatively connected over a wireless connection or a combination of wireless and wired connections. Likewise, any of the graph access devices 56-60 may alternatively be connected to the peripheral 54 using a wired connection, instead of a wireless link, or a combination of wireless and wired connections. Also, there are situations where there is no block access being performed, only graph access.

Figure 7:
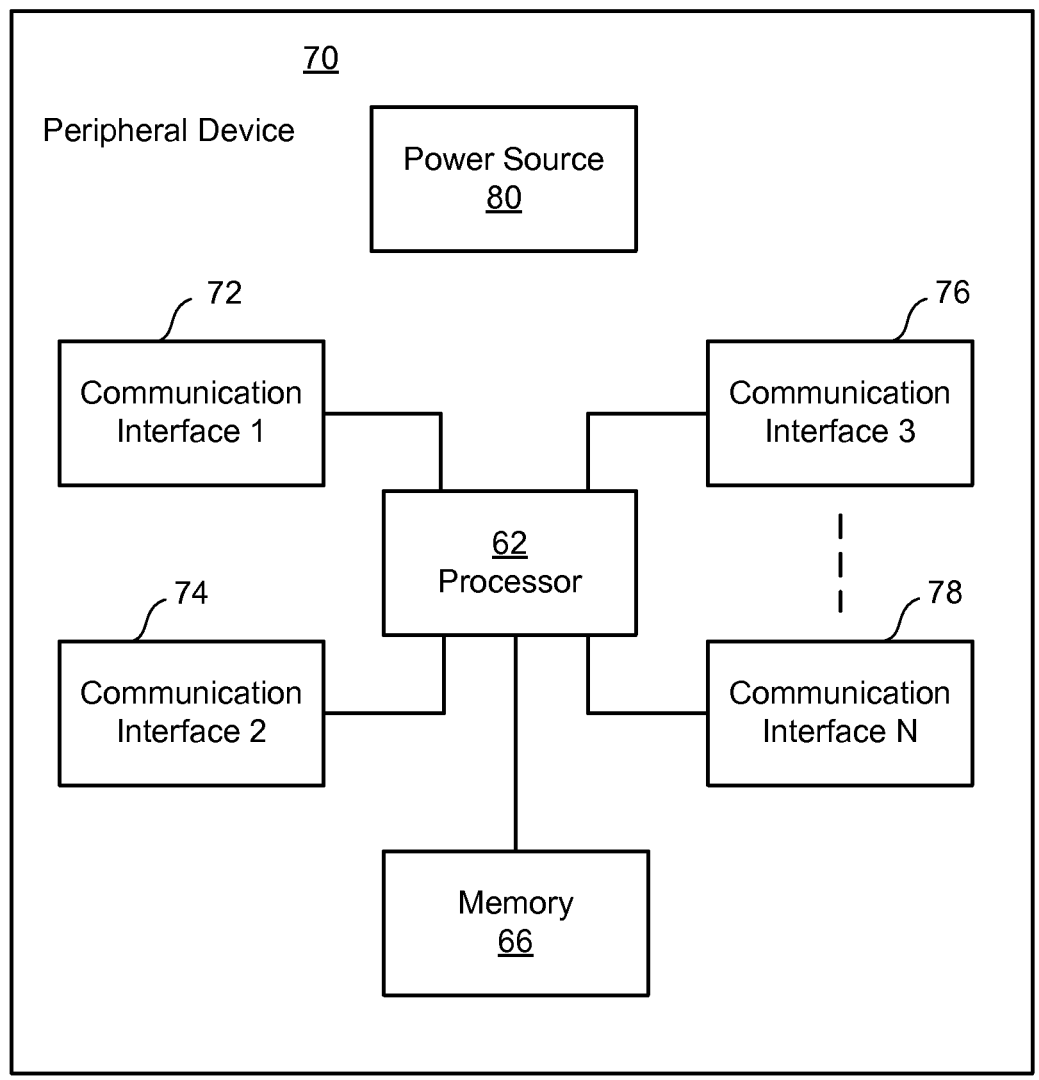
FIG. 7 is a block diagram illustrating certain components of an alternative, exemplary multi-functional peripheral device architecture that includes more that two communication interfaces.

This peripheral 54 can be extended to a more general peripheral architecture as shown in FIG. 7. FIG. 7 is a block diagram illustrating certain components of an alternative, exemplary multi-functional peripheral device 70 that includes more that two communication interfaces 72, 74, 76, 78. The peripheral device 70 also includes the processor 62, memory 66 and a power source 80, which may be a battery, such as a rechargeable battery or other suitable power storage component, such as a super-capacitor. Each of the communication interfaces 72-78 may be either a wired or wireless interface, such as any of those disclosed herein. Each of the communication interfaces 72-78 is a different function on the peripheral 70, and the processor 62 maps the interfaces 72-78 to the shared memory 66. The communication interfaces 72-78 can communicate and/or pass data to one another via the shared memory 66 being managed by the processor 62. Block access devices or graph access devices may connect to the peripheral 70 through one or more of the communication interfaces 72-78 and may simultaneously access the memory 66 using the methods described herein.

Figure 8:
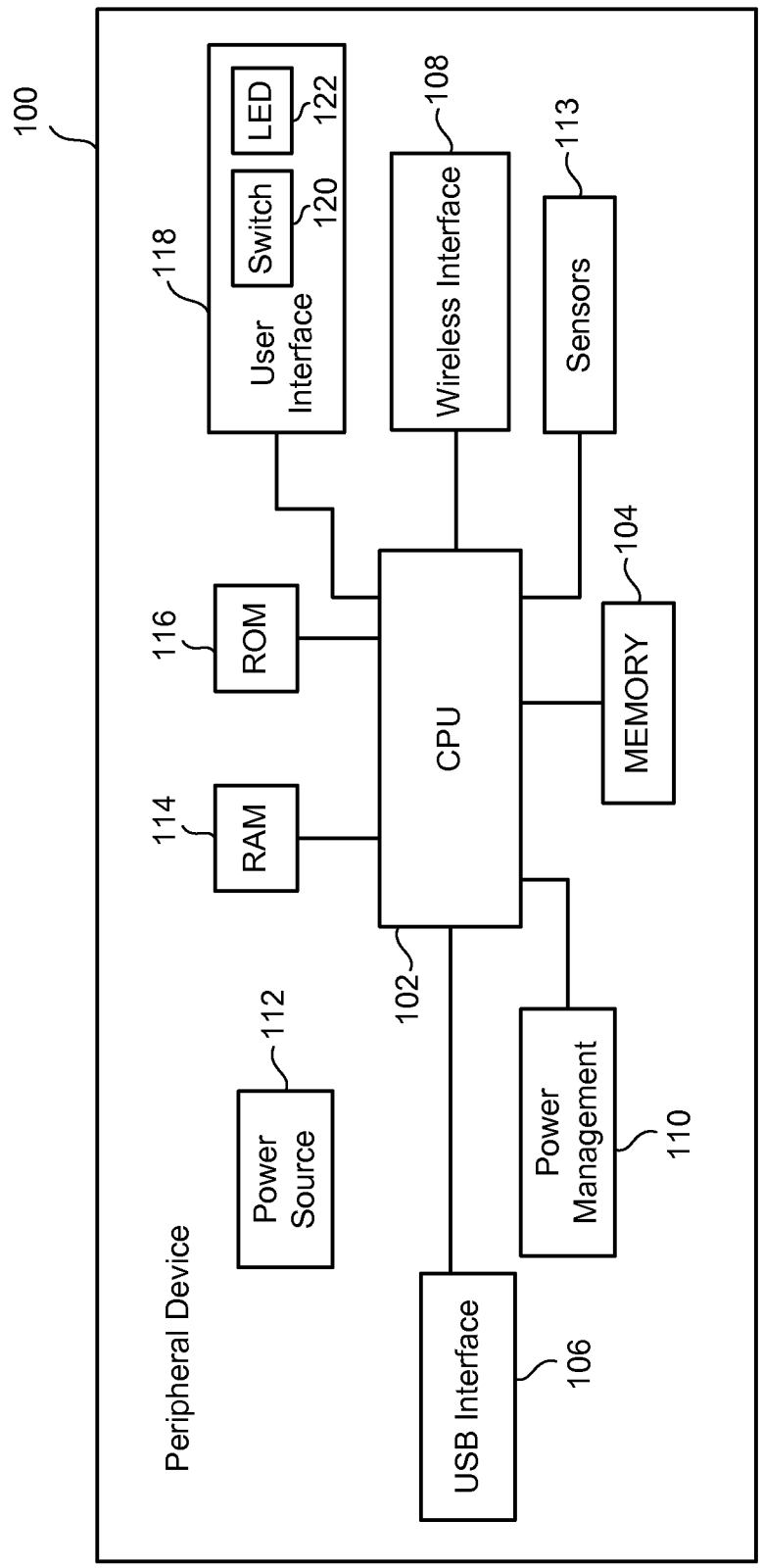
FIG. 8 is a block diagram illustrating certain components of a specific, exemplary implementation of the multi-functional peripheral device shown in FIG. 5.

FIG. 8 is a block diagram illustrating certain components of a specific, exemplary implementation of the multi-functional peripheral device 54 shown in FIG. 5. The peripheral 100 of FIG. 8 includes a central processing unit (CPU) 102 or processor, a memory 104, a USB interface 106, a wireless interface 108, a power management module 110, a power source 112, one or more sensors 113, a random access memory (RAM) 114, a read only memory (ROM) 116, and a user interface 118. The user interface 118 includes a switch 120 and a visual indicator, such as an LED 112.

The CPU 102 may be any suitable digital processor, such as a microprocessor or DSP executing software/firmware instructions, application specific integrated circuit (ASIC), state machine implemented in hardware, or the like for performing the functions disclosed herein. Preferably, the CPU 102 is an off-the-shelf microprocessor including on-board memory, such as the RAM 114 and ROM 116 for storing programming instructions and data.

The ROM 116 can store boot or start-up code for the peripheral. The CPU 102 uses the ROM 116 to start-up and run its code. As an alternative to the separate ROM 116 for this start-up, or boot, code, it is also possible to use a portion of the memory 104 for the boot code. The RAM 114 can store data and programming instructions used by the CPU 102.

The memory 104 may be any suitable memory device, and is preferably a detachable SD card. With a SD card, the peripheral 100 may include an SD port for receiving the card. The memory 104 is a memory pool, or may be part of a larger memory pool including other physical memories and/or devices. In other instances the memory can be embedded solid-state memory that is not removable, such as flash memory.

The USB interface 106 is preferably a commercially-available USB interface module with digital bus interfacing to the CPU 102, and the wireless interface 108 is preferably a commercially-available Wi-Fi interface module with digital bus interfacing to the CPU 102.

The peripheral device wireless interface 108 may be a Wi-Fi (802.11) interface presented over standard web protocols. The peripheral device 100 contains an IP stack and an HTTP server. It also uses link-local multicast DNS (also known as ZeroConf or Bonjour) to make its presence known to other devices on the wireless network. Access to the peripheral device 100 may be controlled through the use of Wi-Fi encryption (WEP or WPA), through MAC address filtering, and/or through application layer security (SSL and HTTP authentication).

The peripheral device 100 may coordinate access to files amongst multiple connected wireless clients. For instance, when accessing media (video or audio) on multiple connected clients, the peripheral 100 may enable all clients to request a synchronized start to playback. This coordination may be done through a program sent from the peripheral device 100 to clients and run on the client (for instance, rich AJAX client application), or through standard media streaming protocols.

The power source 112 may be a battery, such as a rechargeable battery or other suitable power storage component, such as a super-capacitor, that can be recharged when the peripheral 100 is plugged into a USB port. With the power source 112 added to the peripheral 100, the peripheral 100 can function after unplugging the peripheral device 100 from a host, such as a host USB port. When this occurs, the power source 112 can power the peripheral. Thus, the peripheral 100 can function as a standalone device, either while connected to a USB host or when not connected to the USB host. In addition, the power source 112 can power the peripheral 100 when the host, even though connected, cannot provide enough power for the peripheral 112 to function.

The power management module 110 interfaces to the CPU 102, USB interface 102, power source 112 and user interface 118, generally via the CPU 102. The module 110 includes off-the-shelf software and hardware components for managing the power source 112, including recharging through the USB interface 106, sleep modes and peripheral power status indicators (recharge state, low power state, and the like) displayed by the LED 122 of the user interface 118.

The sensors 113 can include any suitable number or type of context sensors coupled to the CPU 102. For example, the sensors 113 may include a real-time clock, a commercially-available GPS locator module, an accelerometer, biometric sensor, temperature sensor, or the like. The output of the sensors 113 can by used by the CPU 102 in conjunction with methods described herein to grant or deny access to the memory 104 to block access devices and/or graph access devices (e.g., host and/or clients).

With the peripheral 100, a USB host (e.g., block access device 52) communicates with the USB interface 106. The wireless communications function of the wireless interface 108 is mapped to the memory 104, and functions independently of the USB host. The CPU 102 appropriately maps the wireless communications function and data storage function of the USB host together in the memory 104. Additional functions may additionally be memory mapped in the peripheral 100, such functions as providing more sophisticated wireless server and/or management functions. With the USB host accessing the peripheral 100 using the USB Mass Storage protocol, the memory mapping causes the USB host to see the peripheral 100 as a single USB storage device, and not as a logically separate wireless device and storage device, as is conventionally done with USB peripherals. The added functionality of the peripheral can thus be transparent to the host. The USB host does not require any additional drivers for the wireless functionality. All it needs is the communications with the data storage array on the memory 104. This allows for USB hosts that leverage the USB storage protocols to receive added functionality without the additional software requirements on the host.

The CPU 102 can map the memory by internally allocating certain portions of the memory 104 to different functions and mass storage. These allocations are managed by the CPU 102 and may be transparent to the host and other devices communicating with the peripheral 100 through the wireless interface 108.

The memory mapping can refer to physical storage located on the peripheral 100, or any combination virtual and physical storage at any granularity level, e.g., each folder or file resides somewhere else other than in the peripheral, or parts of the same file resides on different memories, or access to memory results in a functional change to the communications interfaces 106, 108.

The CPU 102 can also be configured to permit simultaneous access to the memory 104 by the functions, block access devices, and graph access devices using the methods disclosed herein.

The peripheral architecture, which maps multiple functions into a common (or multiple common) memory space, permits the peripheral device 100 to contain multiple functions, beyond that of a wireless network interface and data storage, that appear as a single logical device to the USB host. For example, although the peripheral 100 may contain a wireless interface 108, mass data storage in the memory 104 and other functions, the USB host may see the peripheral functions as a single file system. Thus, the USB host can treat all of the functions on the peripheral 100 as though the USB host were interacting with files. The host can therefore interface with the peripheral functions at the software application layer level. This allows the USB host to treat the peripheral 100 as one function while there is a mapping by the peripheral 100 to functions, independent of the host (although there can be direct or implicit settings to control that second function set by the USB host via storing the settings in the memory 104).

Neither the USB nor the wireless interfaces 106, 108 of the peripheral device 100 is a direct interface provided by hardware to a connected device/host; they are ultimately controlled by peripheral device software, which allows the software to determine how the storage and/or functions are presented through either medium. In particular, this allows the software to:

1. combine multiple sources of data to produce one logical pool of storage (such as combining data from internal ROM and SD storage on the wireless interface);
2. restrict or prevent access to data based on authentication or other factors; and/or;
3. encrypt data on the memory 104, such as an SD card, requiring a key from a host or client before decryption; and/or;
4. provide additional functionality that has independent data transfer to the logical pool of storage over either the USB or wireless interface 106, 108.

In the example of FIG. 8, Wi-Fi transactions can occur between the peripheral 100 and an external server connected to the peripheral 100 over the wireless interface 108, independent of the USB host interacting with the peripheral 100 as a mass storage device, e.g., whatever is stored as files in the shared memory 104 can be automatically synchronized by the CPU 102 with an external server or one or more other similar devices, over the Wi-Fi interface.

The peripheral 100 can also provide various control methods for the USB host to control aspects of the secondary functions by leveraging the data storage and/or the USB data storage protocols. For example, typical USB Mass Storage protocols and USB host software utilize a well known file storage database such as the file allocation table (FAT) or its variants (vFAT, FAT32, FAT16, exFAT, NTFS, NFS, and the like). In the case when a secondary function is, for example, Wi-Fi wireless communications, the volume name of the data drive can map directly to the SSID name for Wi-Fi at the host. The USB host can then control the name of the SSID using the well-known volume renaming functions. Alternatively, there can be multiple SSIDs each corresponding to a specialized file folder name. This allows a user to browse multiple SSID's when choosing a Wi-Fi network as a simple menu and choose the appropriate and allowed access. Multiple users/servers can access with different security levels via the SSID's to the various folders, as discussed in further detail below.

The CPU 102 can also be configured to provide additional functionality, such as transcoding and/or encryption/decryption. For transcoding, the CPU 102 can automatically transform content, e.g., a video, audio, or document file, from one data format to another, for example, independent of the host initiating the command The CPU 102 can also encrypt and/or decrypt the data going into storage in the memory 104, whether during a transfer or after a file has been transferred.

A basic function of the peripheral device 100 is to provide access to storage through wireless and wired interfaces 106, 108. A certain configuration of the peripheral device 100 comprises a basic implementation of these features to provide USB 2.0 or wireless access to SD/SDHC storage (memory 104). An encrypted firmware download can be placed directly in SD/SDHC storage (memory 104), which is then used to upgrade the built-in ROM 116, or alternatively, it can be directly downloaded into the built-in ROM 116. The download can occur over the USB interface or the Wi-Fi interface. The other component of the composite device is presented as a standard USB 2.0 SD card reader device.

While connected over USB, the peripheral device 100 charges its internal power source 112 by drawing power from the host. When not connected over USB, the peripheral device 100 may either be powered on or powered off, determined by the switch 120, which may be a push-button on the peripheral device 100. When powered on, the peripheral device 100 broadcasts an 802.11 wireless network (using various modes such as ad-hoc/peer-to-peer, infrastructure mode, and/or Wi-Fi Direct). The name of the wireless network may be determined by the name of the inserted SD card (if no card is inserted, a default name is chosen), and the encryption settings are determined by a file on the card (unencrypted if no card is inserted).

Wireless file access may be presented by a standard HTTP server included in the peripheral 100. The peripheral device 100 assigns itself a private, link-local IP address and responds to link-local multicast DNS messages in order to support discoverability from connected clients. The HTTP server can send a dynamic AJAX application to connected iOS devices, e.g., iPhones/iPads, which is used to access files from the peripheral device. Other clients receive a basic file list.

In configurations of the peripheral 100 where the memory 104 is an SD or secure digital high capacity (SDHC) card, when peripheral device 100 is powered on, it scans for the insertion or the removal of an SD/SDHC card. When a card is inserted or removed from the peripheral device 100, a set of actions may be taken in response. If the peripheral device 100 is connected via USB when a card is inserted, it can notify the host that a card has been inserted, which allows the host to view and modify the contents of the card. When a card is removed, the peripheral 100 similarly notifies the host. Information from storage may then be used to configure wireless access. For instance, the volume name of the card may be used to set the SSID of the wireless interface, or files on the card may be used to determine the encryption key. Insertion and removal of the card triggers a state change in the wireless interface 108 depending on the presence of configuration data on the card. Certain files on the card may trigger the peripheral 100 to set default parameters that apply to all cards, or to cards which have no other overriding configuration information.

In alternative configurations, it is possible to substitute a wireline storage interface, such as serial ATA (SATA) or a secure digital (SD) card interface for the USB interface 106. Also, an alternative wireless interface to Wi-Fi can be used for the wireless interface, such as a 3G/4G cellular modem, Bluetooth, NFC, infrared, ZigBee variant, or the like, for example. It is possible to support multiple wireless interfaces (e.g., Bluetooth in addition to Wi-Fi 802.11). The interfaces may provide the same services over different protocols, or may be combined in unique ways. Bluetooth pairing and proximity may be used as a key to unlock access to encrypted storage or authenticate wireless clients. The peripheral device 100 may obtain an Internet connection over Bluetooth (DUN) and use this for file services. If so, it may also share that connection with other devices over Wi-Fi or USB.

In alternative configurations, the memory 104 can be located on one or more devices other than the peripheral 100, such as a network server, that communicates over one or more of the wireless or wireline interface 106, 108. In such configurations, the memory mapping performed by the CPU 102 refers to virtual memory, where there is no physical memory storage array present on the peripheral 100, and transfers to/from that virtual memory require communications between the peripheral 100 and a remote storage server/unit. In this case, the peripheral 102 is configured to present the data to other host/clients over the other wireless or wireline interface 106, 108 as being located physically on the peripheral device 102, when it actually is not. In these configurations, it is also possible for the CPU 102 to cache some of the remotely stored content onto local memory storage (such as RAM 114) where appropriate to improve performance, such as network latency and speed when the host is accessing the remote memory. In this case, the cached data is transparent to the host, i.e., the host gets the local memory storage performance benefits, but still sees the cached data as being stored on in a storage array on the peripheral 100.

Figure 9:
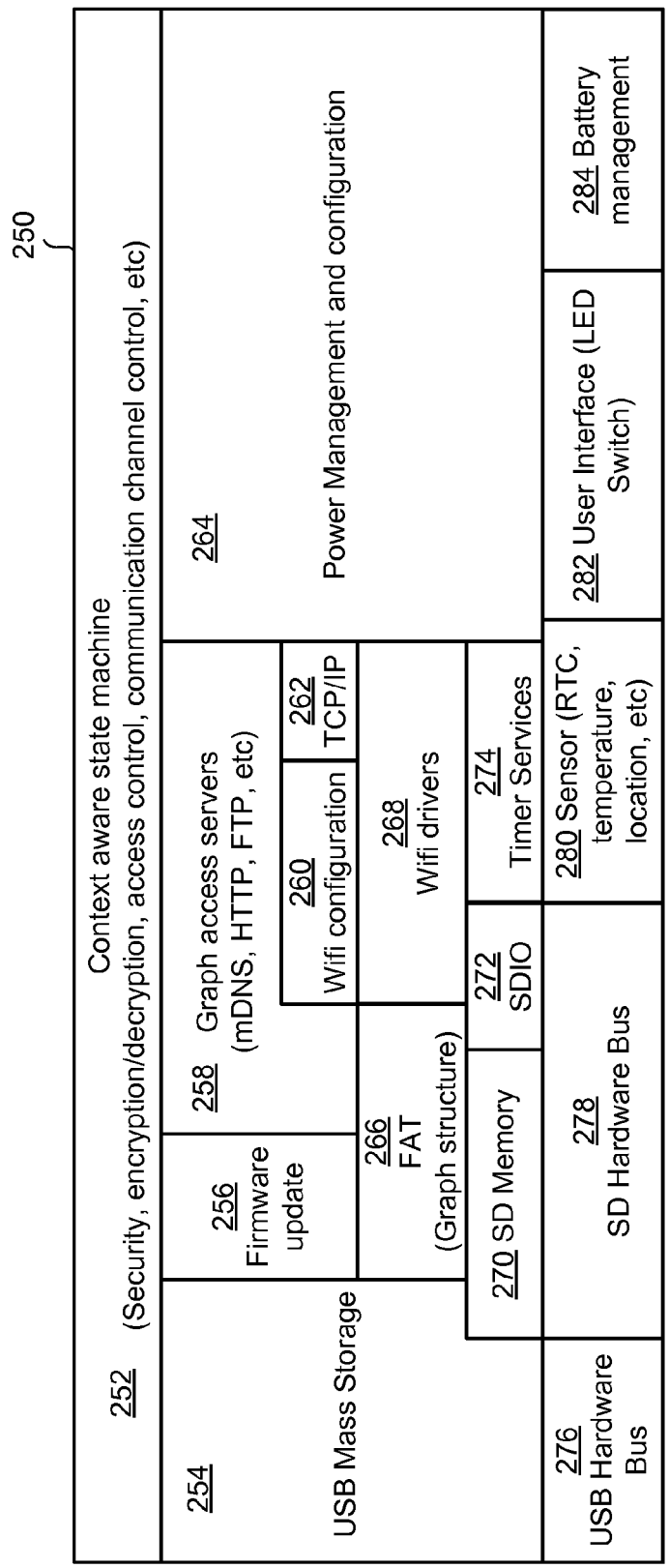
FIG. 9 is a diagram illustrating an exemplary software architecture of the multi-functional peripheral device.

FIG. 9 is a diagram illustrating an exemplary software architecture 250 of the multi-functional peripheral device 100. The software architecture 250 of the peripheral device 100 is composed of a number of layered components.

The lowest layer of software handles the interfacing to the peripheral device hardware and controls the USB device, SD card interface, Wi-Fi SDIO interface, the user interface, including the LED and switches, clocking and power control, and battery charging. The lowest layer of software includes a USB hardware bus interface 276, SD hardware bus interface 278, SD memory drivers 270, SD input/output (SDIO) 272, timer services 274, sensor interface(s) 280, including software interfaces to, for example, a temperature sensor, real-time clock, GPS location module, and the like, user interface 282, timer services 274, battery management 284, and Wi-Fi drivers 268. This layer forms a Hardware Abstraction Layer that is used by the rest of the peripheral device software.

The upper layers of the peripheral device software define the major features of the device. These layers include: USB Mass Storage protocol software 254, firmware update software 256, graph access servers (e.g., mDNS, HTTP, FTP or the like) 258, Wi-Fi configuration software 260, a TCP/IP stack 262, power management and configuration software 264, a graph data structure, such as a FAT 266, and a context aware state machine 252.

The context aware state machine 252 can include software code for implementing the methods disclosed herein. The state machine 252 can also include software code for providing additional services described herein, such as security and authentication, encryption/decryption, transcoding, memory and function access control, communications channel control and the like.

The firmware update software 256 is used for in-system update of the peripheral device software via the SD card interface 278 or USB interface 106. The USB specification is not static and updates and extensions to the protocol occur periodically. Other updates may include new profiles to improve interoperability by eliminating the need for updating the host with new software drivers, such as a new standard for wireless networking.

The USB Mass Storage protocol software 254 presents the contents of the memory 104 (and possibly other data) over the USB interface 106 to a connected host as an attached disk. In another instance, there can be other USB protocols such as USB network access that connects to the host as a network peripheral with access to the memory 104.

The power management and configuration software 264 controls battery charging and power saving modes.

The software can configure the peripheral 100 to function as either a Wi-Fi access point (AP), or alternatively, a Wi-Fi client. When operating as a Wi-Fi AP, the peripheral 100 provides a portable personal area network (PAN) surrounding the peripheral 100. In another instance, the peripheral 100 can be made to function using simultaneous AP and client access, and may leverage the Wi-Fi Direct standard.

In some configurations, the peripheral 100 can be "mated" to one or more Wi-Fi clients to enhance functionality when it operating in its Wi-Fi AP mode. The peripheral 100 is mated to the clients by storing the MAC addresses and certain login credentials, if necessary, of each client. When the peripheral 100 is in AP mode, it sniffs the Wi-Fi channel for the MAC address of a mated client being transmitted to another AP. The mated client will broadcast its MAC address when it attempts to connect to another AP. When the peripheral 100 detects the client's broadcasted MAC address, it then waits and detects the other AP's destination MAC address broadcasted in response to the client's connection request. The peripheral 100 then compares the destination MAC address to stored login credentials corresponding to the client, if they are needed to connect to the other AP. Alternatively, the peripheral 100 can sniff the login credentials from the connection transmissions of the client. If the peripheral 100 is within range of the other AP, it can switch to Wi-Fi client mode and connect to the other AP as a Wi-Fi client using the mated device's credentials. Alternative software architectures can be implemented to achieve the same result. Also, reduction, substitution, addition, and/or rearrangements can be made using known software techniques to implement the peripheral software/firmware.

II. Methods of Accessing a Memory Pool

Figure 10:
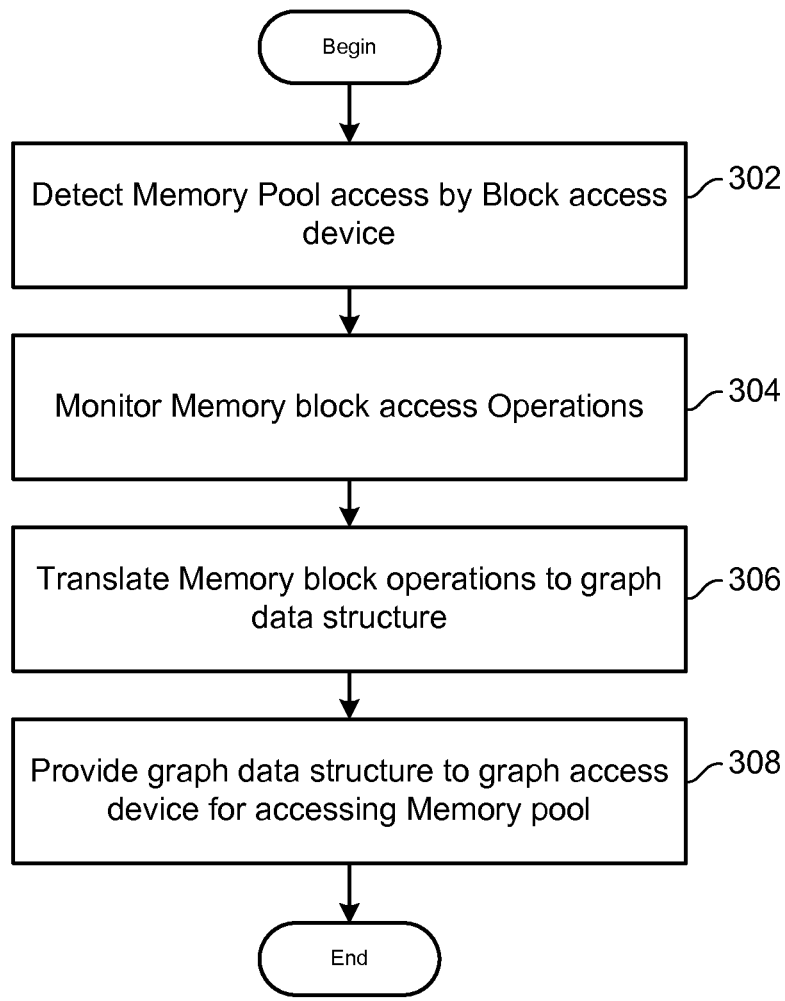
FIG. 10 is a flowchart illustrating an exemplary method for allowing a graph access device and a block access device to simultaneously access a shared memory pool.

FIG. 10 is a flowchart 300 illustrating an exemplary method for allowing a graph access device and a block access device to simultaneously access a shared memory pool. The method may be executed by any of the peripherals 54, 70, 100 described herein. A graph access refers to accessing data organized in a graph, whereby a server or processor receives high level access commands and resolves the graph to the memory pool contents by means of a data structure, such as a graph data structure. A block access refers to accessing a memory pool with a discrete start location address and end location address.

In step 302, an attempt to access the memory pool by a block access device is detected. If the peripheral grants permission to access the memory pool, the peripheral processor then proceeds to monitor memory block access operations performed by the block access device while accessing the memory pool (step 304). The memory block access operations may include block read or block write operations. The processor keeps track of the type of operations (read or write), the number of operations, and memory address locations of the operations during the block access.

Next, in step 306, the block access operations are translated by the processor into a graph data structure representing the memory pool. The graph data structure includes one or more pointers mapping the memory pool to a hierarchical file system. Examples of simple graph data structures are shown in FIGS. 11-12 and 14-15. A resolution process may be used in the translation step, i.e., resolving multiple buffered updates to the graph data structure. N-way merge algorithms that are known in the art may be used in the resolution.

The need for a resolution arises because of the block accesses. Whenever a graph access occurs in the memory pool, the graph data structure is always left in a well-formed state. However, when a block access occurs, the graph data structure may temporarily be left in an ill-formed state. The peripheral processor will resolve the graph at some point in the future.

There are various levels of granularity as to when to resolve/start the resolution process:

1. Least granular: Delay resolution until all access (block and graph, both read & write) ceases, i.e., delay resolution until both USB host ejects the device and all Wi-Fi clients disconnect, then resolve.
2. Delay resolution until block access has ceased, then update the graph data structure in a way that locks out graph access until the resolution has finished, then resume graph access, e.g., stall Wi-Fi communications until the resolution has finished.
3. Identify which files are being accessed and immediately resolve files (may not use a separate buffer) for files that are not being simultaneously accessed.
4. Identify the portions of files that are being accessed and immediately resolve those portions. It is also an improvement to predict what portions will be accessed and hold off resolving those portions until the probability of access is reduced.
5. Identify when block access has left the graph data structure in a consistent state, then apply the resolution process.

The device processor may optionally resolve the memory either by updating the internal graph data structure of the peripheral to make the graph consistent with the previous block operations and/or by moving/copying memory blocks to make the block memory consistent with the graph access. Either or both of these resolution operations are incremental updates to the graph (graph data structure) that can occur rather than a complete rescan of the block memory by the processor or the host device to resolve updates that may have occurred. This incremental resolving would occur after a certain set of block accesses by either the graph access device or block access device have completed.

In some situations, translating the block access operations may entail the processor redirecting the requested memory block of address A to another, e.g., address B. This approach is used when the peripheral device's internal graph data structure has been updated and the block access device has not yet updated its own internal graph data structure. Additionally the processor may wait for the block access operations to complete and subsequently re-order blocks and/or restructure parts of the internal graph data structure to keep the block and graph structure consistent with each other.

In step 308, the peripheral processor provides the graph data structure to the graph access device. This may be done by storing the updated graph data structure in a memory area that accessible to the graph access device. The graph access device can then access the memory pool concurrently with the block access device, according to the graph data structure.

Figure 11:
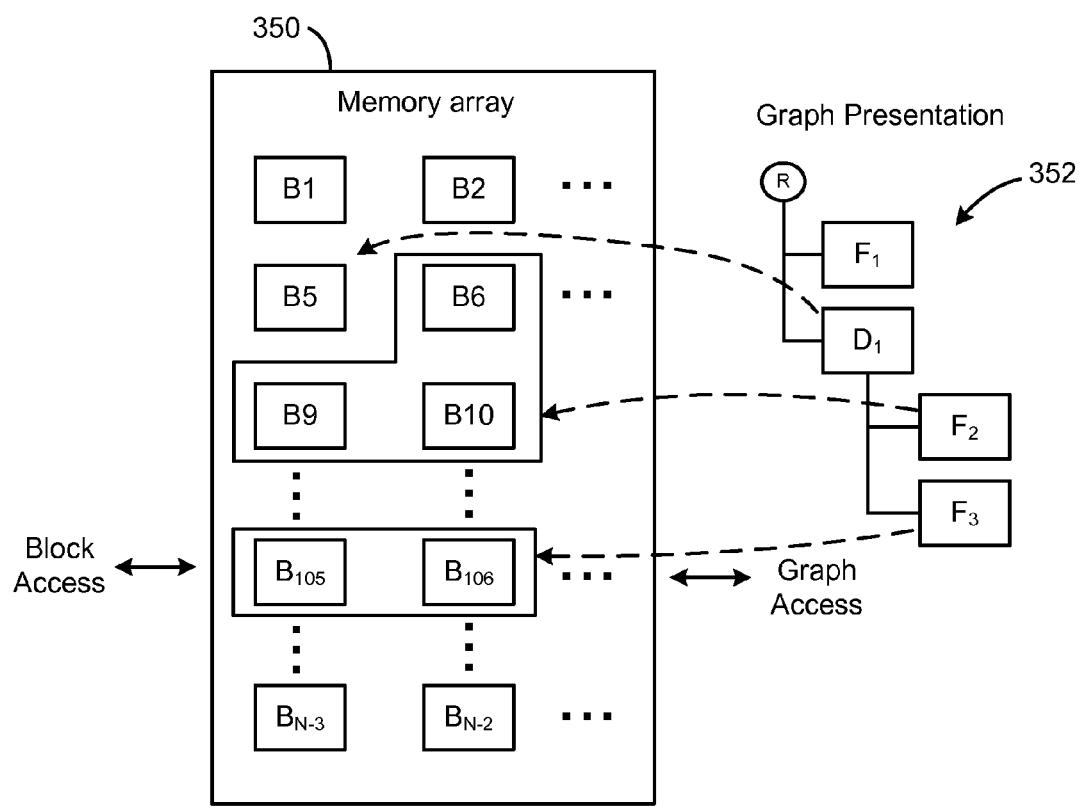
FIG. 11 is a conceptual diagram illustrating an example of mapping a graph data structure to a block memory array.
Figure 12:
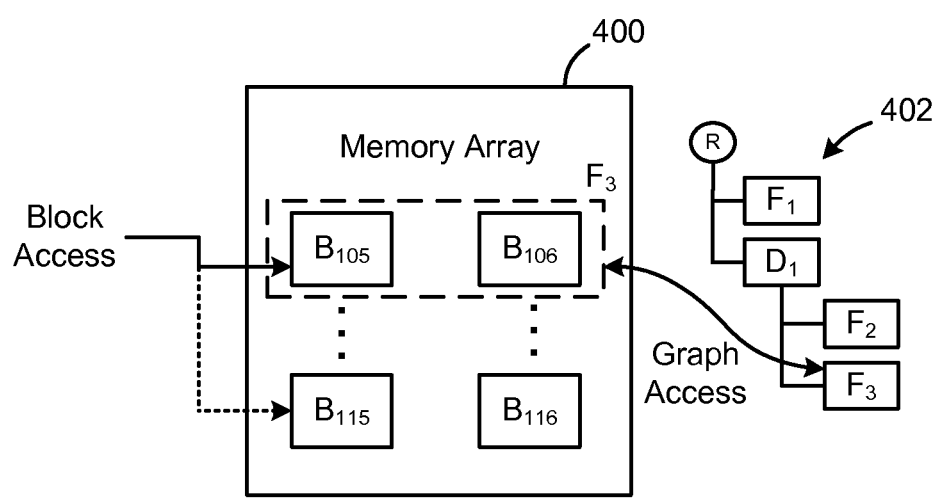
FIG. 12 is a conceptual diagram illustrating an example of using a shadow memory technique to permit simultaneous memory access for a block access device and graph access device.

FIG. 11 is a conceptual diagram illustrating an example of mapping a graph data structure 352 to a block memory array 350. The memory array 350 may be included in any of the memories described herein (e.g., memories 66 or 104), either locally or distributed, physical or virtual. In the example shown, the memory array 350 includes memory blocks (or clusters) B1-Bn, where n is any suitable integer value. Each block may include any suitable number of bytes.

A block access device may access any of the blocks in the array 350 that it is permitted to access by providing a block address to the processor 62 or 102, which then either writes data into the addressed block or reads data from the addresses block, depending on the block access operation.

The graph data structure 352 imposes a hierarchical graph representation on the memory array 350. The graph data structure may include a file storage database such as FAT or its variants (vFAT, FAT32, FAT16, exFAT, NTFS, NFS, and the like). In the example shown, the graph data structure 352 includes a root directory, R, files $F_1$, $F_2$, $F_3$ and directory $D_1$.

Each of these elements of the graph data structure includes pointers identifying memory blocks corresponding to the element. For example, directory $D_1$ corresponds to block B5; file $F_2$ corresponds to blocks B6, B9-B10; and file $F_3$ corresponds to blocks B105-B106.

A graph access device accesses the memory array 350 using the graph data structure 352. The graph access device does this by reading, writing or otherwise manipulating files and/or directories in the data structure 352. The processor 62 or 102 uses the pointers in the graph data structure 352 to then access the corresponding memory blocks in the array 350.

Figure 13:
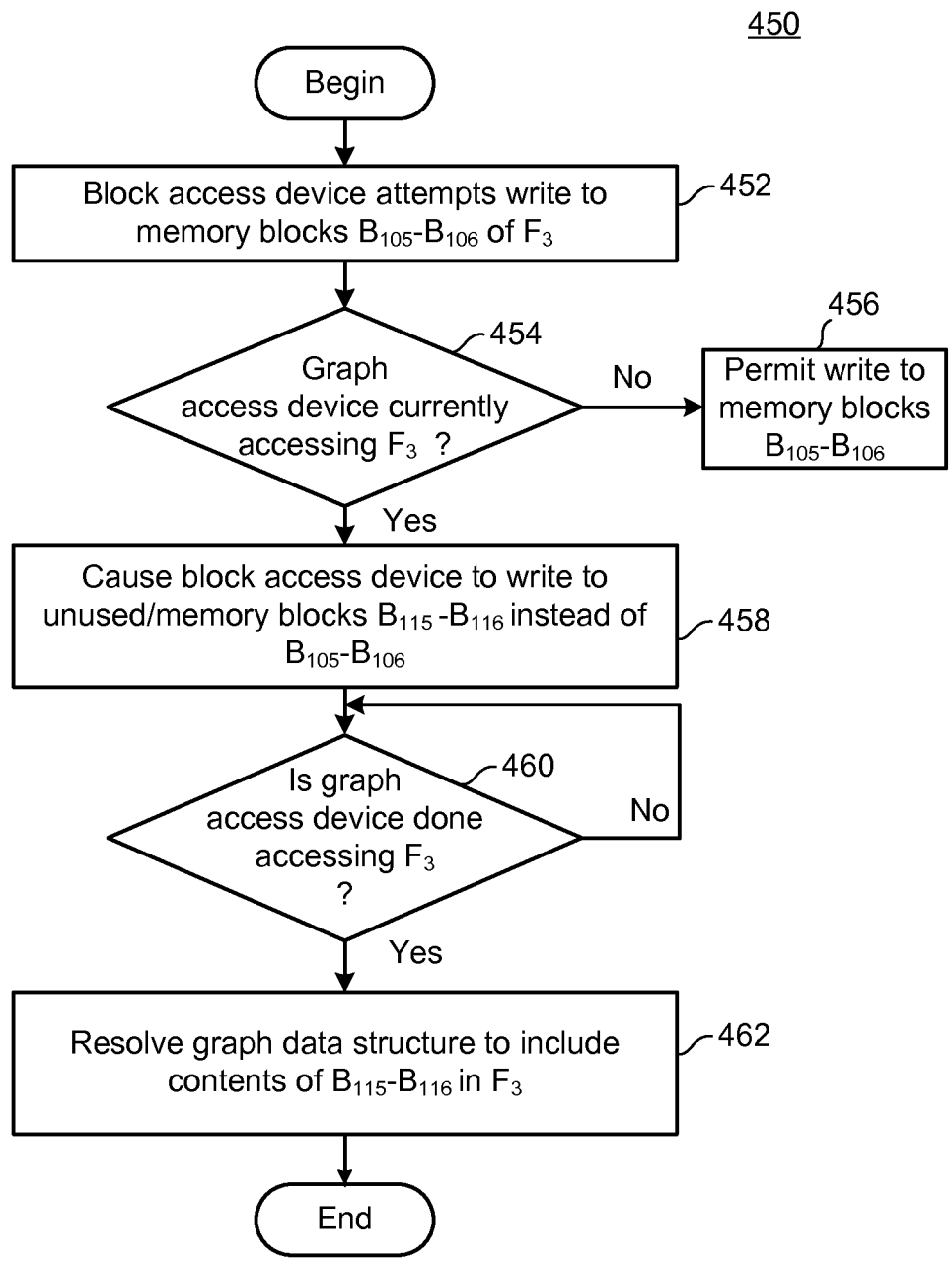
FIG. 13 is a flowchart illustrating an exemplary method shadow memory to allow simultaneous access to a memory pool.

FIG. 13 is a conceptual diagram illustrating an example shadow memory technique for permitting apparently simultaneous memory access for a block access device and graph access device. The shadow memory technique essentially buffers a block memory write from a block access device when the address(es) being written to in the memory array 400 are simultaneously being accessed by another device, such as a graph access device. The technique and memory array 400 can be implemented in any of the peripheral devices 54, 70, 100 described herein, where the memory array 400 can reside in the peripheral memory 66 or 104.

The shadow memory buffer can be in the same memory pool or separate memory pool of the peripheral device. If it is in the same memory pool, buffered data is stored in unused areas of memory array 400. The processor 62 or 100 must either update the graph data structure 402 showing that the memory area for the buffer is reserved, or the processor 62 or 102 keeps its own used-memory table indicating the location of the shadow buffer. When a graph access device or block access device write occurs to the location of temporarily used buffer memory, the processor 62 or 102 redirects the write to an unused portion of the memory array 400.

In the example scenario shown, the block access device attempts to block write to memory blocks B105-B106. The processor 62 or 102 detects that a graph access device is presently accessing the blocks B105-106 as file $F_3$ using a graph data structure 402. The processor 62 or 102 causes the block write to write to blocks B115-B116 instead, which act as the shadow buffer. After the graph access device has completed accessing $F_3$, the processor 62 or 102 resolves the block access write by either updating the pointers in the graph data structure 402 for $F_3$ to point to B115-B116 instead of B105-B106, or alternatively, transfers the contents of B115-B116 to B105-B106, respectively, and then releases B115-B116 as unused blocks.

FIG. 13 is a flowchart 450 provided to more fully illustrate the method of using shadow memory to allow apparently simultaneous access to a memory pool. In step 452, a block access device attempts a write operation to memory blocks B105-B106 of $F_3$ of the memory array 400. Upon detecting the write operation, the processor 62 or 102 determines whether a graph device is currently accessing $F_3$, which corresponds to B105-B106 (step 454). If not, the processor 62 or 102 permits the write to occur to blocks B105-B106 (step 456).

If the graph access device is presently accessing the same memory blocks B105-B106, the processor 62 or 102 causes the block access device to write to the unused memory blocks B115-B116 instead (step 458).

In step 460, the processor 62 or 102 then monitors the graph access device's memory access operations to determine whether the graph access device is done accessing $F_3$. When the graph access device has completed its access operation to the blocks, the processor 62 or 102 resolves the graph data structure to include the contents of B115-B116 in $F_3$. As discussed above in connection with FIG. 12, the buffer contents B115-B116 is resolved into the graph data structure 402 in one of two ways: either the contents of B115-B116 is copied to B105-B106, or pointers in the graph data structure 402 for $F_3$ are updated to point to the buffer B115-B116 instead of B105-B106, and the block written contents remain in the same memory locations B115-B116.

Figure 14:
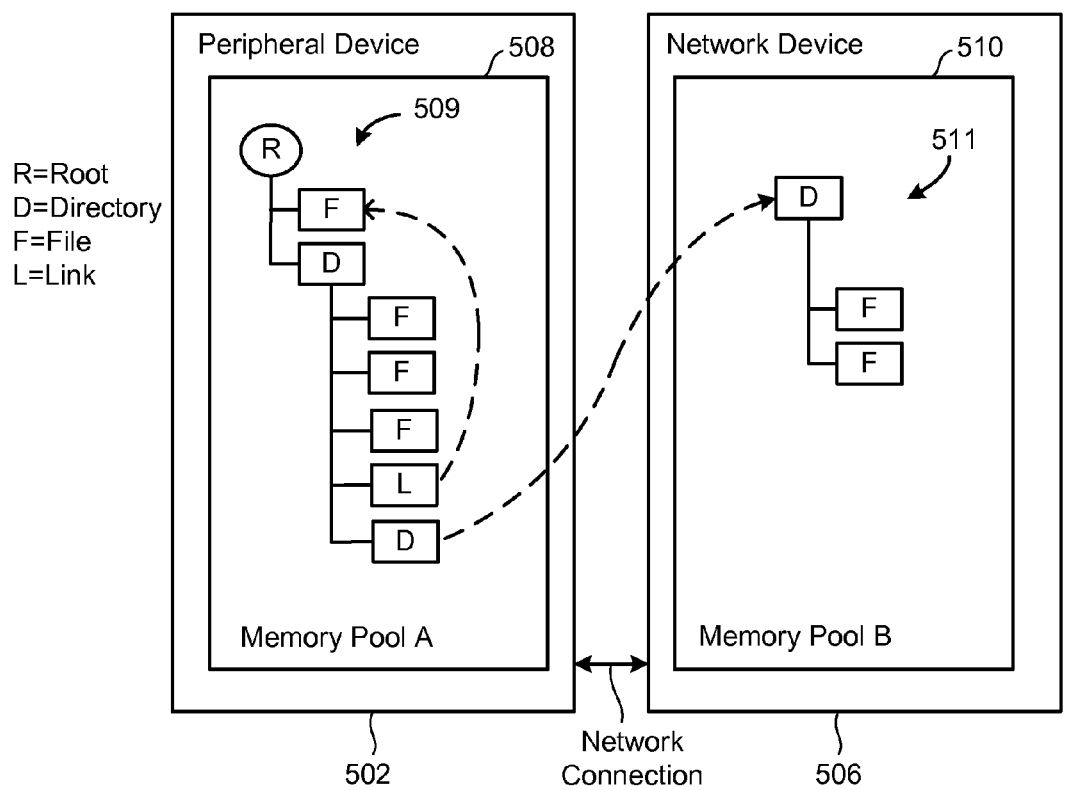
FIG. 14 is a conceptual diagram illustrating a memory pool distributed over multiple devices to support cloud computing.

FIG. 14 is a conceptual diagram illustrating a memory pool distributed over multiple devices 502, 506 to support cloud computing. The memory pool includes memory pool A 508, which resides on a peripheral device 502. The peripheral device 502 may be any of the peripheral devices 54, 70, 100 described above. The memory pool also includes memory pool B 510, which resides on a networked device 506. The networked device 510 is connected to the peripheral device 502 over any suitable network connection, including the wireless networks and wireline networks (e.g., USB) described herein.

The peripheral device 502 is configured to present the distributed memory pool to other connected devices, such as a USB host or Wi-Fi clients, as a single, logical memory pool, even though it is composed of separate memory pools A and B 508, 510 physically located on separate devices. The peripheral device 502 does this by using a graph data structure 509 that includes pointers linking it to a second graph data structure 511 mapping the memory pool B 510, thereby logically mapping both memory pool A and B 508, 510 as a single logical memory. The second graph data structure 511 may be stored in the memory pool B on the network device 506, as shown in FIG. 14, or elsewhere, as long is it accessible to the peripheral device 502 for referencing memory pool B 510.

External data services are also referred to and may be treated as memory pools. For example, an RSS news aggregator service may be an external third-party server that has a graph data structure that points to other servers with news stories. This is a graph data structure and memory pool that can be accessed by the peripheral 54, 100 through a graph mapping.

The graph data structure 509 of the peripheral 508 can be updated by either:

Pull: access to resources via block or graph access may trigger pulling data that is in a physically separate memory pool.

Push: access to memory pool located somewhere else that causes a trigger (connect to a new Wi-Fi network, get a notification from a service, e.g., Facebook update, etc.) to start access to update a portion or all of the graph data structure 509 for the memory pool located off the peripheral device 508.

Figure 15:
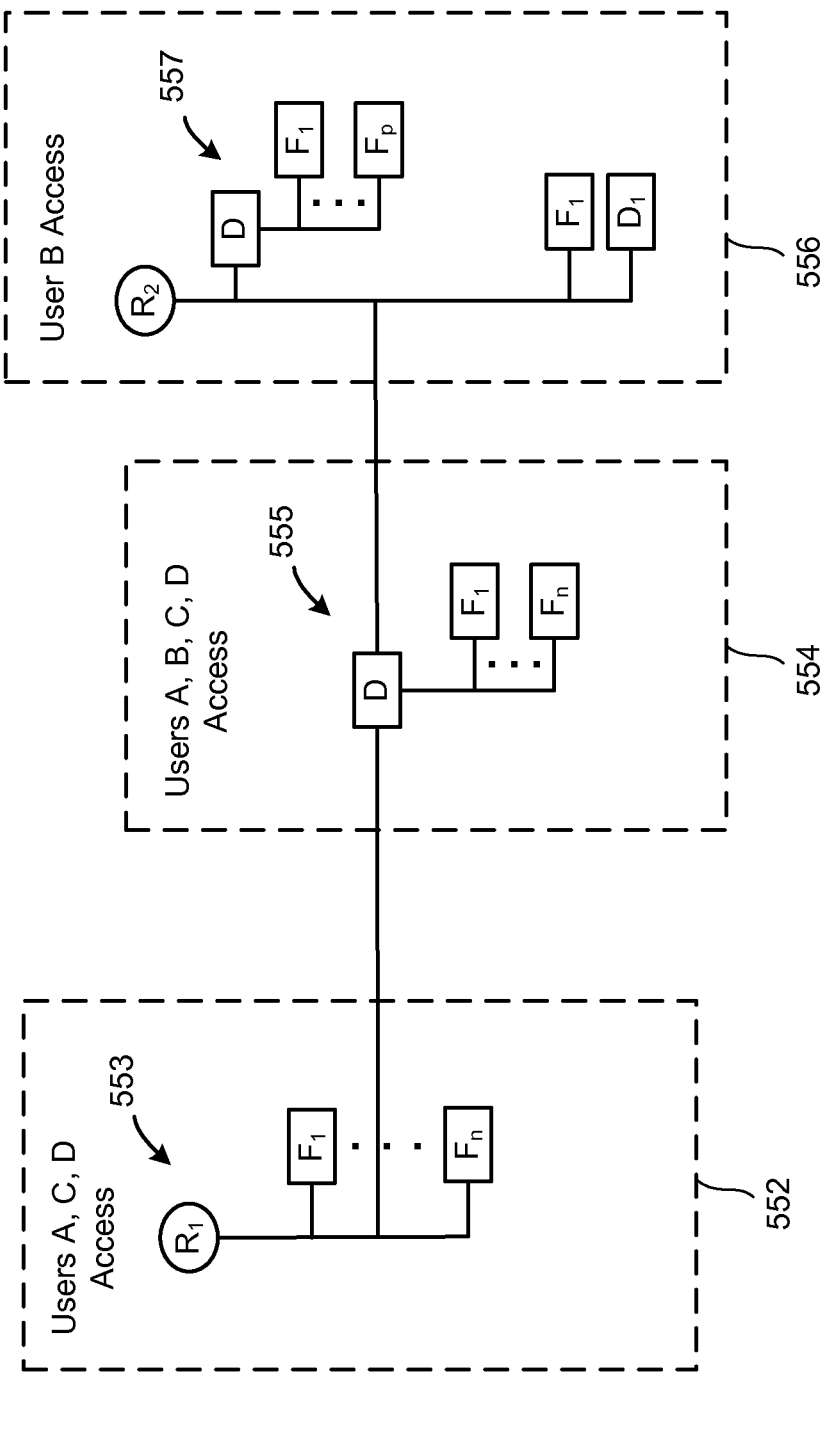
FIG. 15 is a conceptual diagram illustrating an exemplary partitioning of a memory pool into areas restricted to certain users.

FIG. 15 is a conceptual diagram illustrating an exemplary partitioning of a memory pool 550 into areas restricted to certain users. The context aware state machine 252 executing on the peripheral device 100 may include a security mechanism that restricts users to certain files and directories within one or more graph data structures. The user can be authenticated by password, for example, or other means in order to gain access to areas of the memory pool 550. The permissions for granting access may be stored and organized as part of the graph data structures.

In the example shown, users A, C, and D are given access to a first memory pool partition 552, represented by a graph data structure 553. Only user B is given access to a third memory pool partition 556, represented by a graph data structure 557. All of the users A, B, C and D have access to the second memory pool partition 554, represented by a graph data structure 555, by way of a directory, D, common to all of the users.

Figure 16:
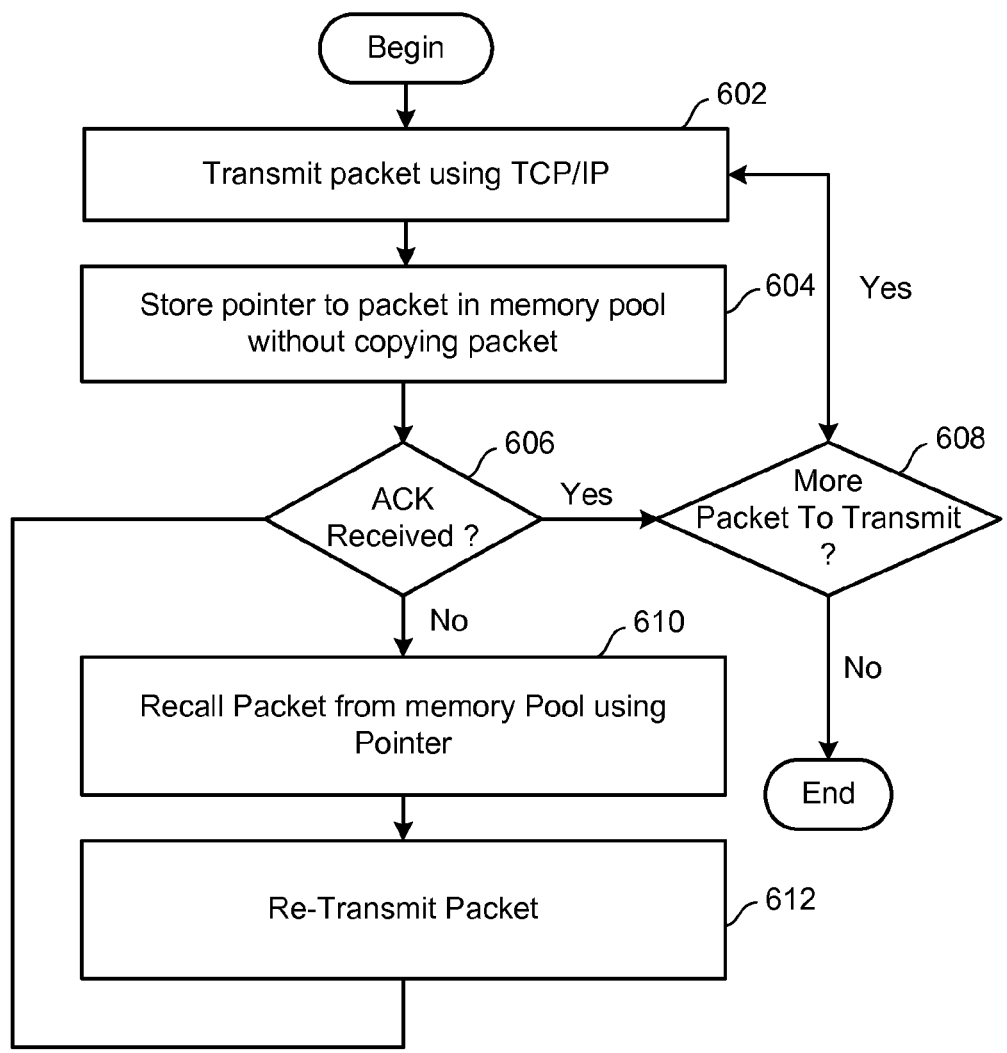
FIG. 16 is a flowchart illustrating an exemplary method of transmitting TCP/IP packets using reduced memory space.

FIG. 16 is a flowchart 600 illustrating an exemplary method of transmitting TCP/IP packets using reduced memory space. This method may be implemented by software (e.g., the TCP/IP stack 262 and/or state machine 252) running on the peripheral 100. The method is advantageous in that it reduces memory storage requirements for executing the TCP/IP protocol, which can be important in devices having limited memory and resources, such as a peripheral device.

In step 602, a packet is transmitted using TCP/IP. In the context of peripheral 100, the TCP/IP packet may be transmitted over the wireless interface 108, or the USB interface 106. Using conventional TCP/IP, a copy of the transmitted packet is normally stored in temporary memory until an acknowledgement (ACK) is received from the recipient TCP/IP node, indicating that the transmission was successful. If an ACK is not received, the sender can quickly retrieve the copied packet from temporary memory and re-send it. However, the drawback of using this conventional TCP/IP method of temporarily storing a copied packet can consume relatively large amounts or memory, which may not be desirable in applications where memory space is constrained.

To overcome this drawback, the method of FIG. 16 stores a pointer to the transmitted packet where it exists in a memory pool, without copying the transmitted packet (step 604). After transmitting the packet, a check is made to see if an ACK is received from the recipient, using conventional TCP/IP protocol steps (step 606). If an ACK is received, a determination is made to determine whether additional packets need to be sent (Step 608). If so, the method returns to step 602, otherwise the method terminates.

If an ACK is not received from the recipient as prescribed by the TCP/IP protocol, the pointer is used to recall the packet from the memory pool (step 610), and the packet is re-transmitted (step 612).

III. Peripheral Security

Portions of a memory pool supported by the peripheral 54, 70, 100 can be encrypted, at a device/partition level or at an individual file level. When individual portions of the storage are encrypted with different keys, the whole storage area may be accessible using a master key, with the individual sub-keys stored in reserved area (encrypted using the master key); or, the whole storage area may be encrypted with one key.

Unlocking the encrypted storage may be done via either wired or wireless interfaces. To authenticate the host, the peripheral device 54, 70, 100 may present a standard mass storage device to the host, and require that the host write out a file or create a directory with a certain name which acts as the key; or it may communicate with a program running on the host. Wireless authentication may be used to unlock the storage for either wireless or wired access. Access after unlocking may be timed, may last until the user explicitly locks the storage again, and/or may last until the authentication from the current wireless network (whitelist) ceases or other wireless networks are detected (blacklist). The same mode of access control used for wireless authentication may be used. For instance, the user may authenticate for wireless access using WPA2, which would then unlock the wired access to storage for a set duration of time. Other standard authentication methods NFC (near field communication) pairing, RFID, or Bluetooth) may also be used to unlock storage.

The peripheral processor may also determine whether to provide block access or graph access connectivity. In this case, the processor uses a state machine to determine how to block certain access, whether over certain pipes (connections) or to various portions of the memory pool. To do this, the processor looks at the requests from the host and determines what type of access to provide based on the request, or provides an offering of services from a known priority list and see how the device responds, or permits the connection based upon a previously stored setting, or permits the connection based upon a determined contextual state, such as time, presence of certain preexisting connections or identified hosts, peripheral location, type of data stored in the local memory pool, or the like.

There are sets of rules that the peripheral processor can follow to determine connectivity. The rules can refer to all the various contexts the peripheral device is aware of, such as connected clients or available clients (Wi-Fi network presence), data in the memory pool, preset conditions, sensor data (time, temperature, light, location), graph and/or data comparisons (authentications, etc.)

These comparisons enable payment systems and the like.

Another configuration is the peripheral connecting to a client as a network device with graph access rather than block access (act as a network device to a PC that will pop up web, i.e., graph, access to the data rather than a WebDAV or USB mass storage device with block access).

Data received from a connected client, whether through block or graph access, can also trigger access permission events. For example, a file can be written that has a set of parameters to modify client device connectivity, e.g., a text file that turns on/off connectivity to Wi-Fi versus a 3G/4G data connection. Another example is naming a file directory in the graph to capture RSS feeds from a particular external network service and/or memory pool.

There can also be combined data and connectivity intelligence where the processor makes decision based upon both specific data and connectivity events. This can contribute to the current context of the peripheral device at a specific point in time.

IV. Graph Access-to-Block Access Mapping

The peripheral device 54, 100 may present storage over a wired interface 64, 106 which is ultimately derived from a combination of local storage and remote content obtained over the wireless interface 68, 108. The wireless content may come from a variety of sources, and may be asynchronously cached to local storage by the peripheral device software. Example information sources include:

1. a file share on a local network;
2. a RSS feed comprising a podcast, photostream, or other collection of information; and/or
3. a collection of videos from an online network, such as YouTube Each of these sources of information may be mapped to an individual directory accessible via the wired interface 64, 106. The various sources may be combined together either at a device level (presentation of multiple attached storage devices) or at a file system level (creation of a virtual file system and FAT table from multiple sources of information).

There is also the ability to enable volume/partition, file, and/or folder level access to particular users. A folder labeled "Bob" can be associated with access for the user "Bob" to have permissions to this folder when "Bob" is on the same network and/or accesses through a remote server. It is also a unique function to have more than one peripheral that is paired with another and always attempts to make sure that some or all of the data is synchronized between the devices whether synchronizing directly between Wi-Fi, for example, or through remote servers whether they act as a proxy and/or as remote storage.

When accessing wireless information, some, none, or all of that information may be placed into memory 66, 104 on the peripheral device 54, 70, 100 as appropriate. For instance, a file share may not require any caching of data; any file requests would immediately be translated into wireless file share requests. Caching may be added for additional performance.

A folder on the peripheral device 54, 70, 100 may be designated as a download area for other remote content, such as RSS feeds, and the device will automatically download content as it becomes available to this folder.

Wireless state changes may also cause downloads to be initiated. For instance, if a remembered wireless network becomes available, the peripheral device 54, 70, 100 may search for and download updated information. Another example is if the peripheral device 54, 70, 100 is plugged in to the USB port on a car stereo, when the car returns to the owner's driveway, it will connect to the home wireless network and download the latest podcasts, or synchronize files with the owner's computer.

Wireless state changes may also control access to storage. For instance, connecting to a certain wireless network may make certain files or folders available to view and modify. The peripheral device 54, 70, 100 may also be configured so that writing to a certain directory or area of storage is possible at all times, but reading files from that area is not possible except when in range of a certain access point, or when associated to a certain access point. The presence of wireless networks may also trigger the deletion of files ("remote wipe").

It is also possible for the peripheral 54, 70, 100 to detect and record network SSIDs and/or MAC addresses as they are encountered for later processing. This can help track where the device 54, 70, 100 is located over time and can be used in conjunction with a GPS or other triangulation/location function for permissive access or trigger other functions.

It is also a possible configuration for the device 54, 70, 100 to connect to a host over USB with the peripheral emulating a USB network profile. The host would see the peripheral 54, 70, 100 as a network connection, launch a browser or similar application, then stream data as if accessing a server. The peripheral 54, 70, 100 can then act as a server that interactively feeds content to the browser whether that content is on the peripheral device and/or is gathering it from a remote server. This can allow content delivery in a secured manner in a similar manner as content is delivered over the Internet from a remote server.

When a specific file is present in storage (found by name, content, or other factors), the device may change the mode of access presented to the host. If a CD or DVD image with a particular name is found in storage, the peripheral device 54, 70, 100 may present to the host as an attached USB CD or DVD reader, with the file determining the contents of a virtual optical disc inserted into the drive. This particular function makes it easy to install operating systems on computers lacking in an actual optical drive.

A portion of the storage may be reserved for peripheral device functionality. This area may be reserved either at a device or partition level, or by allocating a file of the desired size on the device itself. When a file is altered or deleted from the peripheral device 54, 70, 100, its contents may be copied to the reserved area to allow the user to recover the data later.

V. Cloud Services

A combination of the wired interface and wireless interface can be used to provide additional services to the peripheral device owner. When the wireless interface is connected to the Internet, various actions taken with the storage via either wired or wireless interfaces can be translated to or supplemented with storage from the Internet.

The peripheral device 54, 70, 100 can provide online backup functionality. By monitoring which parts of the storage have been changed by the user, and marking those portions as "dirty" in a table kept in the reserved memory area, the peripheral device 54, 70, 100 knows which portions of the storage must be backed up to a server over the Internet. The contents of data transferred can be encrypted by the peripheral device 54, 70, 100 before transmission to the server. If the device 54, 70, 100 is lost, a command can be sent from the Internet to the device 54, 70, 100 to initiate a wipe of storage on the device 54, 70, 100, and a new peripheral device can be programmed with the contents of the data from the lost device. Likewise if the online backup is changed, it can apply this process in reverse to make sure the peripheral device matches the changes in the online backup.

The peripheral device 54, 70, 100 can take actions based on manipulation of files over a communications interface and translate these into actions on Internet storage through the same or another communications interface. For instance, a particular folder on the device 54, 70, 100 may be designated as a file sharing area, with access given to certain users based on a policy. Moving or copying a file into this folder would initiate a transfer of that file using the wireless interface to remote storage, where it would then be accessible to other users. A folder may be designated as a dropbox for receipt of files from another user, in which case the peripheral device 54, 70, 100 can query and fetch information from remote storage and place it in the folder on the device 54, 70, 100. If all files on the device 54, 70, 100 are encrypted with unique individual keys, the file may be transferred in encrypted form, and the key to unlock the file shared with the other user through secure means.

The Internet service can take actions based on file manipulations that result in additional files being added to the peripheral device storage, or other actions being taken. For instance, placing a file in a certain directory may trigger that file being sent as an email attachment to a predetermined email address. Placing a video file in another directory may trigger a format conversion that takes place on the Internet service, with the converted file then downloaded to a directory on the device 54, 70, 100.

In another configuration, the peripheral device 54, 70, 100 presents a larger data array to the host than is actually present on the peripheral 54, 70, 100. In this case, the file storage appears to the host normally, but the data storage is actually on a networked device in a different location, but is being cached by the peripheral.

The peripheral device 54, 70, 100 can also be configured to enable cloud caching for one or more users, using the memory pool supported by the peripheral as a cache. To do this, the peripheral device is included in the network communication path between one or more on-line cloud servers and the user's device (e.g., host or client).

If the connection to the cloud server goes down, user device is still connected to the peripheral 54, 70, 100. The peripheral 54, 70, 100 caches the data being transferred to the cloud server(s). The peripheral 54, 70, 100, which is acting as a data storage peripheral, then syncs to the cloud server(s) when access is again available in the future.

Alternatively, when there are too many users using bandwidth to the cloud servers, the peripheral 54, 70, 100 can cache/pre-fetch for each user, while it sequentially accesses cloud servers to distribute bandwidth time across users.

The peripheral 54, 70, 100 can also be configured to act as a thin-client network cache or Google Gears built into an AP. In this configuration, the peripheral 54, 70, 100 simulates network resources, for one or more users, that are not present with fallback to network resources when network connectivity becomes available. The purpose of this configuration is to improve response time with congested networks and/or to provide access to network/cloud functionality with intermittent network connectivity. As an example of using this function, a user can send email in to the peripheral 54, 70, 100 when it is in Wi-Fi AP mode, while there is not network/Internet access. When Internet access becomes available, the peripheral 54, 70, 100 becomes a client, connects, sends email over the Internet, using, for example Google Gears.

The peripheral 54, 70, 100 can also be configured to insert advertisements stored in its local memory or from a network server based upon sniffing and/or location information (Skyhook, GPS, or the like). When the peripheral 54, 70, 100 has both simultaneous AP and client mode it can strip out ads and replace them with ads from its local memory storage. These ads can be tracked if clicked and the data can be stored in the graph data structure of the peripheral.

Also, when the peripheral 54, 70, 100 is in AP mode, it can provide several SSIDs. For example, one can be "Vimeo." If selected and the AP senses iPhone, then Vimeo may be spoofed as YouTube to use the iPhone YouTube player

VI. Payment Processing System

Figure 17:
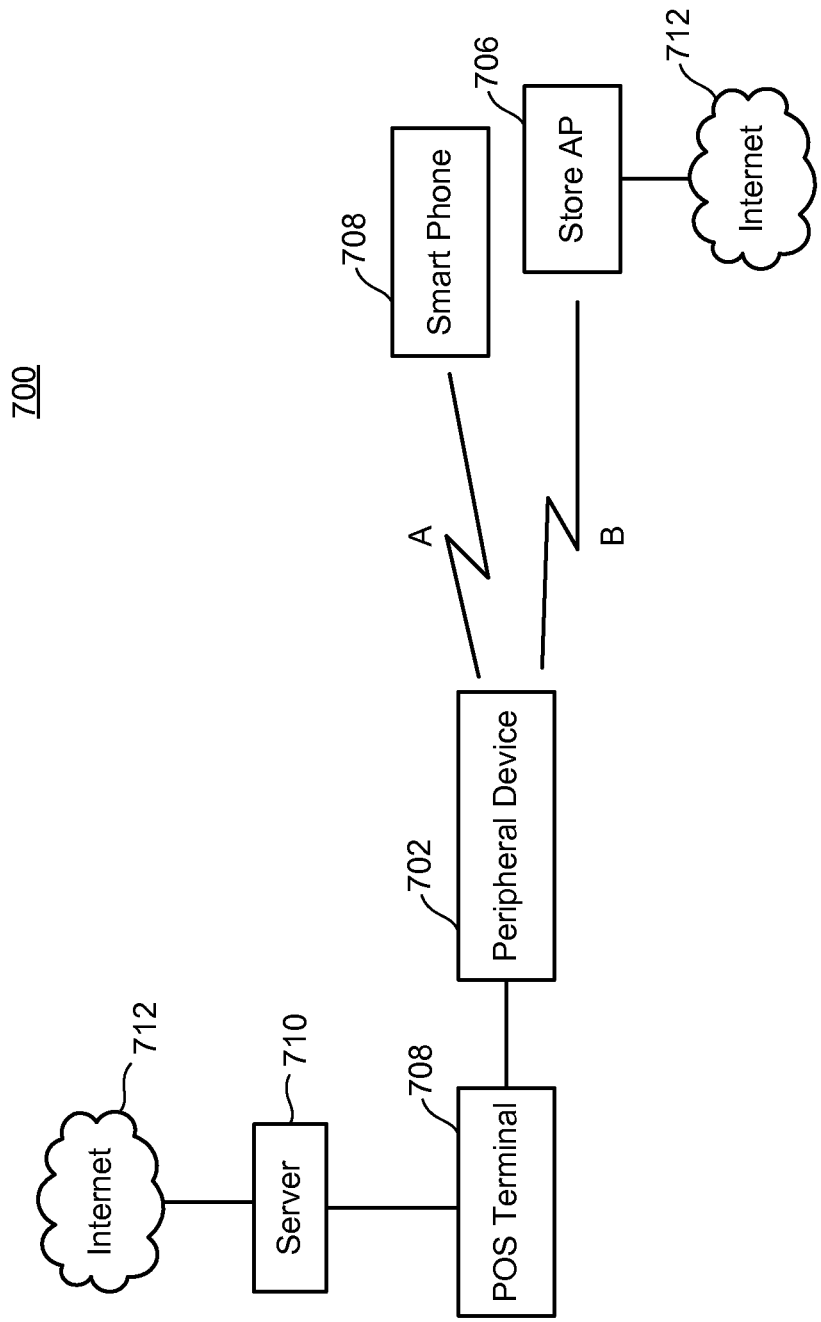
FIG. 17 is a conceptual diagram illustrating a payment processing system that includes a peripheral device.

FIG. 17 is a conceptual diagram illustrating a payment processing system 700 that includes a peripheral device 702, which can be one of the peripherals 54, 70, 100 described herein. The payment processing system 700 includes the peripheral 702, a smartphone or PDA 704, a store or merchant wireless access point (AP), such as a Wi-Fi AP, a point-of-sale (POS) terminal 708, and a payment processing server 710. The peripheral 702 communicates with the smartphone 704 and store AP 706 using wireless channels, such as Wi-Fi connections. The peripheral 702 can also use wireless communications, such as Wi-Fi, to communication with the POS terminal 708, or alternatively, a wireline connection, such as any of those disclosed herein. The POS terminal 708 communicates with the server 710 over a data network. The server 710 and store AP 706 are networked to the Internet 712.

Preferably, the system 700 permits payment processing over Wi-Fi connections from a customer possessing the smartphone 704 and the peripheral 702. The system 700 can support at least two types of payment transactions. In the first transaction type, the system 700 uses the following procedure:

1. The peripheral 702 scans the Wi-Fi channels for the smartphone 704 and securely pairs with it when found.
2. A store cashier rings up transaction at the POS terminal 708.
3. The POS terminal 708 sends total transaction amount to the peripheral 702 over a Wi-Fi connection, which in turn, sends it to the smartphone 704 via Wi-Fi.
4. The customer approves transaction through the smartphone 704.
5. The peripheral 702 transmits to the POS Terminal 708 an indication that the transaction has been approved by the customer.
6. The peripheral 702 then disconnects from the smartphone 704.

With the second type of transaction, the system uses the following procedure:

1. The smartphone 704 runs an application that identifies the MAC address transmitted over the Wi-Fi network by the peripheral 702 as having a valid range.
2. Upon identifying the valu MAC address, the smartphone 704 then initiates a Wi-Fi connection to the peripheral 702.
3. The peripheral 702 communicates with the POS terminal 708 or the store AP 706 to get information about customer's account, e.g., loyalty, coupons, or the like. The communication can occur over wireless channel B or through the POS terminal 708 and/or through server 710 and/or Internet 712.

4. The procedure then executes steps 3-6 of the first transaction type, above.

In multi-lane payment systems, such as multiple check-out lanes in a supermarket, there can be confusion for pairing between the client, e.g., smartphone 704 and the server, e.g, the peripheral 702. There are various methods to solve the multi-lane issue. One method is to use RF triangulation. Another method is to vary the range of the wireless signal emitted from the peripheral 702 to prevent communications from one lane to the other. To accomplish this, the peripheral 702 can be configured to execute the following procedure:

1. The peripheral 702 limits the Wi-Fi range of its transmission to several inches (channel A in FIG. 17), until communication commences when the smartphone 704 is within a close range. The peripheral does this by reducing its Wi-Fi transmit power. The smartphone 704 comes within range by the customer holding the peripheral 702 and smartphone 704 close together.

2. Once Wi-Fi communication with smartphone 704 is established, the transmission range of the peripheral device 702 can be increased to allow customer to hold the phone normally. Interference between lanes will not occur once the Wi-Fi session is established between the peripheral 702 and the smartphone 704.

3. If the peripheral 702 needs to communicate to the store's Wi-Fi AP 706 for remote WAN/Internet connections, the range can be changed (channel B in FIG. 17) in a multiplexed fashion from the short range to customer's smartphone 704 to a long range to the store's Wi-Fi AP 706. The peripheral may also change between an access point mode and client mode as needed.

4. Once the payment process is completed, the process returns to step 1.

Additional functions can be added to the peripheral to improve utility. Such functions, can include security, synchronization of media playback, combining multiple files into a single file (e.g., photosharing on TV), automatic transcoding of files, for example video and/or audio files, documents, e.g., from .doc to .pdf, and the like.

This disclosure presents new methods and architectures for a peripheral device to create new, enhanced functionality that provides new functionality both as a USB peripheral and a stand alone device. Certain configurations of the architecture involve having the same function as a traditional USB Mass Storage device, but are novel by adding additional functionality that does not directly interface through the USB port, but rather through a share memory scheme involving data storage included on the peripheral. The additional functionality can be communications, such as a wireless modem such as Wi-Fi, 3G/4G cellular modem, Bluetooth, NFC, infrared, or wireline communication, such as USB, Ethernet or the like. In a further method, a complex state machine, such as a processor, provides functional operations with or independent of the USB port. These functional operations include low-level arbitration of the memory access between the USB port and the other functions, such as communications functions, file or database access to the data storage, or higher level functions, such as a web server, data synchronization engine, encryption/decryption, authentication, and other complex state functions.

The functionality of the systems, devices, and their respective components, as well as the method steps and blocks described herein may be implemented in hardware, software or firmware executed by a processor, or any suitable combination thereof. The software/firmware may be one or more programs having sets of instructions (e.g., code segments) executable by one or more digital circuits or processors, such as microprocessors, DSPs, embedded controllers, or intellectual property (IP) cores. If implemented in software/firmware, the instructions or code may be stored on one or more computer-readable media. Computer-readable medium includes both computer storage medium and communication medium, including any medium that facilitates transfer of a computer program from one place to another. A storage medium may be any available medium that can be accessed by a computer. By way of example, and not limitation, such computer-readable medium can comprise RAM, ROM, EEPROM, NAND/NOR Flash, CD-ROM, or other solid-state storage, optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

Other embodiments and modifications of the methods, devices systems and apparatuses described above will occur readily to those of ordinary skill in the art in view of these teachings. Thus, the foregoing description is illustrative and not restrictive. The invention is to be limited only by the following claims, which cover all such other embodiments and modifications, when viewed in conjunction with the above specification and accompanying drawings. The scope of the invention should, therefore, not be limited to the above description, but instead should be determined with reference to the appended claims along with their full scope of equivalents.

What is claimed is:

1. A method for a graph access device and a block access device to simultaneously access a memory pool shared between the devices, comprising:

monitoring one or more memory block access operations performed by the block access device while accessing the memory pool;

modifying a graph data structure based on the memory block access operations, the graph data structure including a plurality of pointers mapping the memory pool to a hierarchical file system;

the graph access device accessing the memory pool concurrently with the block access device, according to the graph data structure;

the block access device attempting to write to a first memory block in the memory pool;

determining whether the graph access device is presently accessing the first memory block;

if the graph access device is presently accessing the first memory block, the block access device writing to a second memory block instead of the first memory block; and resolving the graph data structure to indicate at least one memory location of the write performed by the block access device.

2. The method of claim 1, wherein resolving the graph data structure includes changing a pointer in the graph data structure from indicating the first memory block to indicating the second memory block.

3. The method of claim 1, wherein resolving the graph data structure includes copying the contents of the second memory block to the first memory block subsequent to the graph access device completing its access to the first memory block.

4. The method of claim 1, wherein the memory pool is a single logical memory.

5. The method of claim 1, wherein the memory pool is included in a peripheral device.

6. The method of claim 1, wherein the memory pool is distributed among a plurality of separate networked devices.

7. The method of claim 1, wherein the graph access device includes a wireless client configured to access the memory pool over a wireless link.

8. The method of claim 1, wherein the block access device includes a USB host configured to access the memory pool over a USB connection.

9. The method of claim 1, wherein the block access device provides a discrete start location memory address and a discrete end location memory address, each located in the memory pool, for accessing the memory pool during the memory block access operations.

10. The method of claim 1, wherein monitoring includes:
    determining whether the block memory access operations are writing to memory locations in the memory pool storing the graph data structure; and
    determining whether the block memory access operations are writing to memory locations in the memory pool storing data content.

11. The method of claim 10, wherein modifying includes updating the graph data structure based on the memory locations written to by the block access device during the block memory access operations.

12. The method of claim 1, wherein modifying includes updating the graph data structure based on a count of block memory access operations accessing predetermined memory address locations in the memory pool.

13. An apparatus, comprising:
    a memory pool shared between a graph access device and a block access device;
    means for monitoring one or more memory block access operations performed by the block access device while accessing the memory pool;
    means for modifying a graph data structure based on the memory block access operations, the graph data structure including a plurality of pointers mapping the memory pool to a hierarchical file system;
    means for the graph access device accessing the memory pool concurrently with the block access device, according to the graph data structure;
    means for the block access device to attemptwriting to a first memory block in the memory pool;
    means for determining whether the graph access device is presently accessing the first memory block, wherein if the graph access device is presently accessing the first memory block, the block access device writes to a second memory block instead of the first memory block; and
    means for resolving the graph data structure to indicate at least one memory location of the write performed by the block access device.

14. A peripheral device, comprising:
    a memory shared between a graph access device and a block access device;
    a first communication interface configured to communicate with the block access device;
    a second communication interface configured to communicate with the graph access device;
    a processor, operatively coupled to the memory, and the first and second communication interfaces, configured to:
    monitor one or more memory block access operations performed by the block access device while accessing the memory;
    modify a graph data structure based on the memory block access operations, the graph data structure including a plurality of pointers mapping the memory to a hierarchical file system; and
    permit the graph access device to concurrently access the memory, according to the graph data structure, while the block access device is also accessing the memory;
    determine whether the block access device attempting to write to a first memory block in the memory pool;
    determine whether the graph access device is presently accessing the first memory block, wherein if the graph access device is presently accessing the first memory block, the block access device writes to a second memory block instead of the first memory block; and
    resolve the graph data structure to indicate at least one memory location of the write performed by the block access device.

15. The peripheral device of claim 14, wherein the memory is included in a memory pool that is distributed among the peripheral device and at least one other separate device.

16. The peripheral device of claim 14, wherein the second communication interface is configured to communicate with a plurality of graph access devices and the memory is shared between the block access device and the plurality of graph access devices.

17. The peripheral device of claim 14, wherein the processor is configured to encrypt content stored in the memory.

18. The peripheral device of claim 14, wherein the processor is configured to transcode content stored in the memory.

19. The peripheral device of claim 14, wherein the processor is configured to authenticate the block access device and grant access to the memory only to a properly authenticated block access device.

20. The peripheral device of claim 14, wherein the processor is configured to authenticate the graph access device and grant access to the memory only to a properly authenticated graph access device.

21. A non-transitory computer-readable medium embodying a set of instructions executable by one or more processors, comprising:
    code for monitoring one or more memory block access operations performed by the block access device while accessing the memory pool;
    code for modifying a graph data structure based on the memory block access operations, the graph data structure including a plurality of pointers mapping the memory pool to a hierarchical file system;
    code for the graph access device accessing the memory pool concurrently with the block access device, according to the graph data structure;
    code for determining whether the block access device is attempting to write to a first memory block in the memory pool;
    code for determining whether the graph access device is presently accessing the first memory block;
    wherein if the graph access device is presently accessing the first memory block, the block access device writing to a second memory block instead of the first memory block; and code for resolving the graph data structure to indicate at least one memory location of the write performed by the block access device.

* * * * *